(12) United States Patent
Bhagwat

(10) Patent No.: US 11,301,800 B1
(45) Date of Patent: Apr. 12, 2022

(54) PACKAGE TRACKING UTILIZING MODIFIABLE DELIVERY TAGS

(71) Applicant: Amazon Technologies, Inc., Seattle, WA (US)

(72) Inventor: Chinmay Hemant Bhagwat, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1002 days.

(21) Appl. No.: 15/069,912

(22) Filed: Mar. 14, 2016

(51) Int. Cl.
| | |
|---|---|
| *G06Q 10/08* | (2012.01) |
| *G06K 7/14* | (2006.01) |
| *H04W 4/021* | (2018.01) |
| *G06Q 10/06* | (2012.01) |
| *G09F 3/20* | (2006.01) |
| *G06K 7/10* | (2006.01) |
| *G08B 15/02* | (2006.01) |
| *G08B 13/24* | (2006.01) |

(52) U.S. Cl.
CPC ....... *G06Q 10/0833* (2013.01); *G06K 7/1413* (2013.01); *G06Q 10/063114* (2013.01); *G09F 3/208* (2013.01); *H04W 4/021* (2013.01); *G06K 2007/10524* (2013.01); *G08B 13/2402* (2013.01); *G08B 15/02* (2013.01)

(58) Field of Classification Search
CPC ........... G06Q 10/08; G06Q 10/063114; G06Q 10/083–0833; G06K 19/07703; G06K 19/06028; G06F 3/147; G09G 2380/04; G09F 3/208; G09F 3/0297; G09F 3/0288
USPC ................... 705/330–333; 340/572.8, 572.9
See application file for complete search history.

(56) References Cited

U.S. PATENT DOCUMENTS

| | | | |
|---|---|---|---|
| 5,929,415 A | 7/1999 | Berson | |
| 6,974,080 B1* | 12/2005 | Goggins | G06K 19/06046 235/462.01 |
| 2002/0167500 A1* | 11/2002 | Gelbman | G06F 3/14 345/204 |
| 2004/0243452 A1 | 12/2004 | Barton et al. | |
| 2005/0234785 A1* | 10/2005 | Burman | G06K 17/00 705/28 |
| 2006/0145837 A1* | 7/2006 | Horton | G06Q 10/08 340/539.13 |

(Continued)

OTHER PUBLICATIONS

How Stuff Works, "What is a Dye Pack?" <https://science.howstuffworks.com/question671.htm> (<http://web.archive.org/web/20160303215600/https://science.howstuffworks.com/question671.htm> captured Mar. 3, 2016 using Wayback Machine). (Year: 2016).*

(Continued)

*Primary Examiner* — Michael P Harrington
*Assistant Examiner* — Brian A Tallman
(74) *Attorney, Agent, or Firm* — Kilpatrick Townsend & Stockton LLP

(57) ABSTRACT

In some examples, a movement range indicating a geospatial boundary for executing delivery of a package including a delivery tag may be received by a user device. The delivery tag can include a modifiable display area including first identification information. Location information related to the user device or related to the delivery tag can also be received. A position of the user device or the delivery tag with respect to the geospatial boundary can be determined. Based on the position, the modifiable display area of the delivery tag can be modified to include second identification information.

20 Claims, 13 Drawing Sheets

(56) References Cited

U.S. PATENT DOCUMENTS

| | | |
|---|---|---|
| 2006/0229895 A1 | 10/2006 | Kodger et al. |
| 2006/0261946 A1 | 11/2006 | Himberger et al. |
| 2006/0279527 A1* | 12/2006 | Zehner .................. G06Q 30/00 345/107 |
| 2007/0015552 A1 | 1/2007 | Bolling |
| 2007/0200701 A1 | 8/2007 | English et al. |
| 2008/0004995 A1 | 1/2008 | Klingenberg et al. |
| 2008/0197969 A1 | 8/2008 | Vogt et al. |
| 2008/0280591 A1* | 11/2008 | Opaluch ................ H04M 11/04 455/410 |
| 2008/0303637 A1 | 12/2008 | Gelbman et al. |
| 2009/0020609 A1* | 1/2009 | Cohen .................. G06K 7/1095 235/462.01 |
| 2011/0133888 A1* | 6/2011 | Stevens ............. G06Q 10/0833 340/8.1 |
| 2011/0238300 A1* | 9/2011 | Schenken ............. B60W 40/09 701/408 |
| 2012/0162013 A1 | 6/2012 | Piersol et al. |
| 2013/0151434 A1 | 6/2013 | Chandaria |
| 2013/0211976 A1 | 8/2013 | Breed |
| 2013/0295955 A1* | 11/2013 | Sheshadri ............... G01S 19/34 455/456.1 |
| 2014/0210624 A1* | 7/2014 | Wandel ............... E05B 73/0017 340/572.1 |
| 2015/0019384 A1 | 1/2015 | Fabian et al. |
| 2015/0254611 A1 | 9/2015 | Perez |
| 2016/0098730 A1 | 4/2016 | Feeney |
| 2016/0253617 A1 | 9/2016 | Truong et al. |
| 2017/0046657 A1 | 2/2017 | Allen |
| 2017/0185961 A1 | 6/2017 | Shiryan et al. |
| 2017/0195182 A1* | 7/2017 | Nair ........................ H04L 41/12 |

OTHER PUBLICATIONS

"Radio-Frequency Identification", Wikipedia, Available Online at, <https://en.wikipedia.org/wiki/Radio-frequency_identification><http://web.archive.org/web/20150201133957/https://en.wikipedia.org/wiki/Radio-frequency_identification>, Feb. 1, 2015, 14 pages.

"RFID Out of the Box", Modern Material Handling (Warehousing Management Edition, Framingham vol. 62, Issue 6, Jun. 2007, pp. 47-52.

Ergen et al., "Assessing the Need for Storing Data on Radio Frequency Identification (RFID)", ISSN: 2706-6568, Section 3.1, 2009, 10 pages.

U.S. Appl. No. 15/069,883, U.S. Patent Application, filed Mar. 14, 2016, Titled: Package Tracking Utilizing Passive Delivery Tags.

U.S. Appl. No. 15/069,899, U.S. Patent Application, filed Mar. 14, 2016, Titled: Package Tracking Utilizing Active Delivery Tags.

ADNAS: Crime Fighting Has Never Had a Weapon Like This. [online] Applied DNA Sciences, Mar. 2016 [retrieved on Mar. 19, 2016], Retrieved from the Internet <URL: http://www.adnas.com/>, 2 pages.

Lenticular Printing, [online], Wikipedia, Jan. 17, 2016 [retrieved on Mar. 19, 2016], Retrieved from the Internet: <URL: https://en.wikipedia.org/wiki/Lenticular_printing>, 8 pages.

Temiz, et al., "Lab-on-a-chip devices: How to close and plug the lab?" *Microelectronic Engineering*, vol. 132 (Jan. 25, 2015), pp. 156-175.

* cited by examiner

PACKAGE TRACKING UTILIZING MODIFIABLE DELIVERY TAGS

CROSS-REFERENCE TO RELATED APPLICATIONS

This application is related to and incorporates by reference for all purposes the full disclosures of co-pending U.S. patent application Ser. No. 15/069,883, filed Mar. 14, 2016, and entitled "PACKAGE TRACKING UTILIZING PASSIVE DELIVERY TAGS" and co-pending U.S. patent application Ser. No. 15/069,899, filed Mar. 14, 2016, and entitled "PACKAGE TRACKING UTILIZING ACTIVE DELIVERY TAGS".

BACKGROUND

As a package is shipped from a warehouse to a recipient, the package can change custody between different carriers. Each time the package changes custody, opportunities are presented for delivery agents and non-delivery agents to illegitimately obtain the package. These opportunities may be even greater with respect to a last mile carrier (e.g., a carrier that actually delivers the package to the recipient). This may be because a delivery agent of the last mile carrier can rather easily mark a package as "delivered" using a handheld delivery device, but in actuality can retain the package for themselves.

BRIEF DESCRIPTION OF THE DRAWINGS

Various embodiments in accordance with the present disclosure will be described with reference to the drawings, in which.

DETAILED DESCRIPTION

Figure 1:
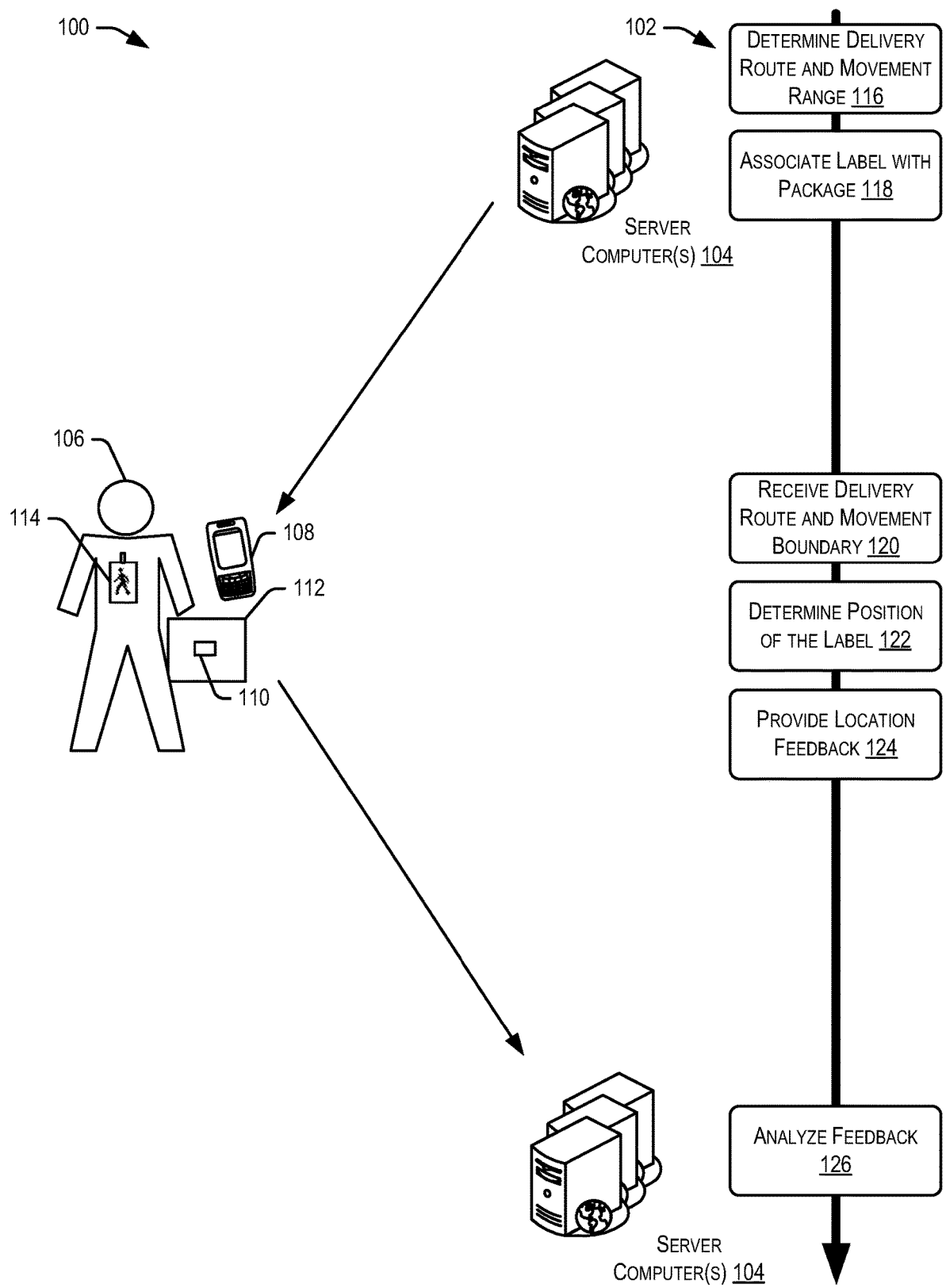
FIG. 1 is an example diagram of a package location system and an example flow diagram depicting techniques relating to tracking movements of delivery packages with respect to delivery movement ranges as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to package location systems and techniques relating to tracking movements of packages with respect to delivery movement ranges. Such techniques can track movements of packages, identify when the packages are located outside of an expected geographic area, record information about the packages being located outside the expected geographic area, and report such information to a computer system (e.g., a server computer). The computer system can use the information to analyze the performance of delivery agents responsible for delivery of the packages, identify possible delivery errors in real-time and instruct the delivery agents, and identify movements likely to be fraudulent. For example, metrics may be collected and analyzed to evaluate how frequently packages associated with the delivery agents end up outside the expected geographic area. When a package is lost in transit, the information can be used to determine whether the delivery agent who had last known custody of the package could be responsible for its disappearance. The information can also be used for resolving customer claims for lost or damaged packages or claims against delivery agents, for reducing theft of packages while the packages are in the custody of the delivery agents, and so forth.

In some examples, package location systems can be used to determine positions of packages using a variety of different techniques described herein. The positions of the packages can be determined in the context of the packages being transported to delivery locations. A delivery route can be generated that includes the delivery locations in an ordered set. For example, the delivery route can include a set of geographic directions for reaching each delivery location and a set of delivery instructions for delivering each package. By following the geographic directions, a delivery agent will be guided to the appropriate delivery locations. By following the delivery instructions, the delivery agent will know which packages to deliver to which delivery locations. The package location systems can determine whether the packages are located, or have been transported, outside a geospatial boundary of a delivery movement range (e.g., an expected geographic area) that corresponds to the delivery route. For example, the geospatial boundary can function as a geo-fence and the package location systems can detect when packages exit and/or enter the geo-fence. Information about movements of the packages can be uploaded to a computer system for analysis, as described herein.

In some particular examples, positions of a package with respect to a geo-fence can be determined, and information about the positions shared, by a handheld delivery device that interacts with a delivery label attached to the package. The delivery label can include a passive delivery tag (e.g., one or two dimensional barcodes or a radio-frequency identification (RFID) tag). The passive delivery tag can include encoded delivery information. A delivery agent, using the handheld delivery device, can scan the passive delivery tag at a time when custody is transferred to the delivery agent (e.g., when the delivery agent picks up the package from a delivery node to fulfill a final delivery of the package to a customer). A distance between the passive delivery tag and the handheld delivery device may be recorded. The handheld delivery device can access a delivery route and the geo-fence associated with the delivery route. Each time the handheld delivery device detects that the passive delivery tag crosses the geo-fence (e.g., enters or exits), the handheld delivery device can record an infraction. Durations associated with each infraction can also be recorded. Messages can be presented by the handheld delivery device that inform the delivery agent of the infractions. If the package is located outside the geo-fence, certain functionality of the handheld delivery device may be disabled. For example, the delivery agent may be unable to use the handheld delivery device to mark the package as "delivered." Information describing the delivery agent's actions and the positions of the package as it was transported can be provided to a computer system for analysis.

In other particular examples, positions of a package with respect to a geo-fence can be determined, and information about the positions shared, by a delivery label that interacts with a passive identification tag (e.g., an identification badge associated with a delivery agent), a handheld delivery device, or directly with a computer system. The delivery label can include an active delivery tag. The active delivery tag can include functionality to store information about a delivery route, the geo-fence, encoded delivery information, and the other similar information. The active delivery tag can also include the functionality to implement computer instructions, determine its geolocation, and transmit information to the other devices introduced above. Each time the active delivery tag detects that it crosses the geo-fence (e.g., enters or exits), the active delivery tag can record an infraction. Durations associated with each infraction can also be recorded. The active delivery tag can share information about the infractions with the passive identification tag (e.g., via radio frequency (RF) signals) immediately when they occur, in response to events, or according to a fixed schedule. When the delivery agent next scans the passive identification tag to enter a building (e.g., a delivery station from where the package originated), a scanner can read the information about the infractions stored on the passive identification tag and provide such information to a computer system for analysis. Like in the other examples described herein, the information about the infractions can identify actions of the delivery agent, positions of the package as it was transported, and other similar information.

In other particular examples, positions of a package with respect to a geo-fence can be determined, and information about the positions shared, by a delivery label that includes an active delivery tag that includes a fluid emitting device. The active delivery tag can include functionality to store information about a delivery route, the geo-fence, encoded delivery information, and the other similar information. The active delivery tag can also include the functionality to implement computer instructions, determine its geolocation, and transmit information to certain other devices. The fluid emitting device of the active delivery tag can be configured to emit a dye or other fluid when the active delivery tag instructs it to do so. For example, when the active delivery tag detects that it exits the geo-fence, the active delivery tag can generate an alarm. The alarm can be provided to the fluid emitting device which can cause the fluid emitting device to release the dye or other fluid. When the dye or other fluid is released, some may land on the delivery agent and/or the delivery agent's identification badge. The dye or other fluid can be invisible to the delivery agent and can be uniquely associated with the package, uniquely associated with the delivery route, and the like. When the delivery agent next enters a building (e.g., a delivery station from where the package originated) by scanning the identification badge at a scanner and/or walking by the scanner, the dye or other fluid can be detected. The detection of the dye or other fluid may reveal that the package traveled outside the geo-fence while in close proximity of the delivery agent (e.g., in the delivery agent's vehicle or in the delivery agent's arms). This may reduce future incidents of loss. Like in the other examples described herein, information about infractions can identify actions of the delivery agent, positions of the package as it was transported, and other similar information, and can be transferred to a computer system for analysis.

In other particular examples, positions of a package with respect to a geo-fence can be determined, and information about the positions shared, by a delivery label that includes an active delivery tag that includes a modifiable display area. The active delivery tag can include functionality to store information about a delivery route, the geo-fence, encoded delivery information, and other similar information. The active delivery tag can also include the functionality to implement computer instructions, determine its geolocation, and transmit information to certain other devices. The modifiable display area of the active delivery tag can be configured to display different barcodes, different versions of the same barcode, identifiers, and other such information that distinguishes first identification information from second identification information. For example, the modifiable display area may include a lenticular image that includes two or more images. Each image can correspond to a version of a barcode. When the active delivery tag detects that it exits the geo-fence, the active delivery tag can send a signal to the modifiable display area to change the lenticular image to display and/or reveal a different version of the barcode. The different version of the barcode, when later scanned by a handheld delivery device, may include information that indicates that the active delivery tag was located outside the geo-fence. In another example, the modifiable display area may include a photo-sensitive substrate that displays a first version of a barcode. When the active delivery tag detects that it is located outside the geo-fence and when a delivery agent attempts to scan the active delivery tag while located outside the geo-fence (e.g., to fraudulently indicate the package as "delivered"), a laser on the handheld delivery device can be activated to modify the photo-sensitive substrate to create a second version of the barcode. The handheld delivery device can detect a location of the active delivery tag, in some examples. The second version of the barcode, when later scanned by the handheld delivery device (or as part of the earlier fraudulent scan), may include information that indicates that the active delivery tag was located outside the geo-fence. Like in the other examples described herein, information about infractions can identify actions of the delivery agent, positions of the package as it was transported, and other similar information, and can be transferred to a computer system directly or via the handheld delivery device for analysis.

Turning now to the figures, FIG. 1 illustrates a package location system 100 and a flow diagram depicting process 102 illustrating techniques relating to tracking movements of delivery packages with respect to delivery movement ranges as described herein, according to at least one example. The package location system 100 can include a server computer 104 (or set of server computers) that interact with one or more devices associated with a user 106 (e.g., a delivery agent). The one or more devices can include a user device 108, a delivery tag 110 attached to a package 112, and an identification tag 114. The delivery tag 110 can be included as part of a delivery label (e.g., share a structure) which can include human-readable and machine-readable elements. In some examples, the delivery tag 110 is a separate structure from the delivery label. The server computers 104 can interact with the devices and/or items via one or more networks, as described in detail herein. The process 102 can be implemented by certain combinations of the server computers 104, the user device 108, the delivery tag 110, and the identification tag 114. For example, at 116, the server computers 104 can determine a delivery route and a movement range for the delivery route. The delivery route can be determined at 116 in response to a customer placing an order for an item. The item can be included in the package 112. The delivery route can include directions for reaching the customer at a customer address and instructions for delivering the package (including the item) at the customer address. The movement range can include a geo-fence (e.g., a virtual barrier) that corresponds to the shape of the delivery route. At 118, the server computers 104 can associate a delivery label with a package. For example, this can include associating the delivery tag 110 with the package 112.

At 120, one or more of the devices 108, 110, or 114 can receive the delivery route and the movement range from the server computers 104. This can include receiving via a network or in response to certain actions, for example, in response to the user 106 using the user device 108 to scan the delivery tag 110. At 122, one or more of the devices 108, 110, or 114 can determine a position of the label. This can include determining the position of the delivery tag 110 (and therefore most likely the package 112 to which the delivery tag 110 is attached) with respect to the movement range. For example, whether the position is inside the movement range, outside the movement range, or within a threshold distance of the movement range measured from within the movement range out from outside the movement range. Depending on the relative position of delivery tag 110 with respect to the movement boundary, certain actions can be taken by one or more of the devices 108, 110, or 114 (e.g., recording information about the position, emitting a dye, modifying a modifiable display area, sharing information with the identification tag 114, and the like). At 124, one or more of the devices 108, 110, or 114 can provide location feedback that is related to the actions taken and/or the position of the delivery tag 110. The location feedback can be provided to the server computers 104. At 126, the server computers 104 can analyze the location feedback. This can include generating suggestions relating to the location feedback. For example, if the location feedback indicates that the delivery tag 110 was located outside the movement boundary and was never marked as delivered by the user 106, the server computers 104 can suggest following up with the user 106 to determine what happened to the package 112.

Figure 2:
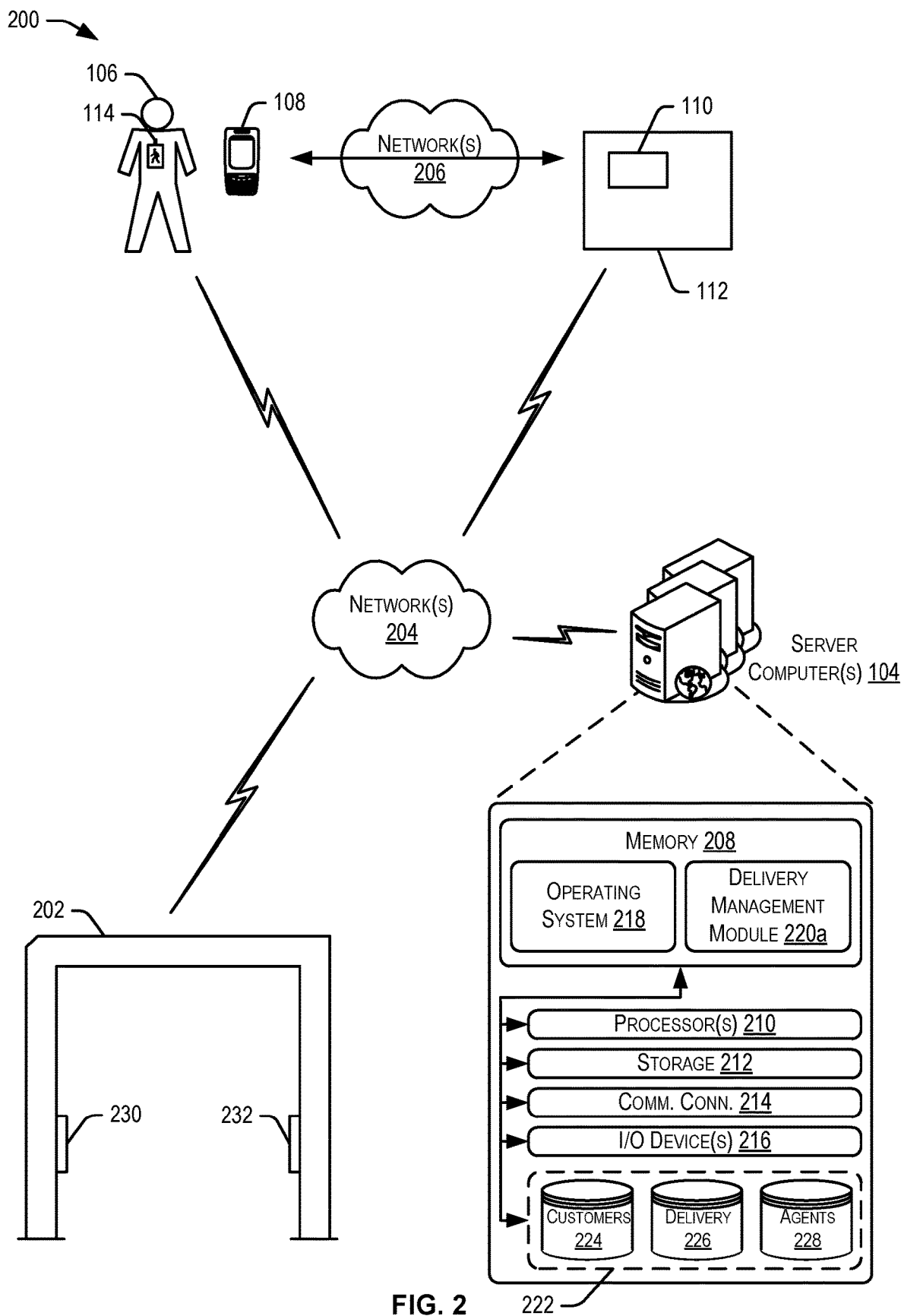
FIG. 2 is an example schematic architecture for tracking movements of delivery packages with respect to delivery movement ranges as described herein, according to at least one example.

FIG. 2 illustrates an example architecture or environment 200 configured to implement techniques relating to tracking movements of delivery packages with respect to delivery movement ranges, according to at least one example. In some examples, the example architecture 200 may further be configured to enable interactions between the user device 108, the delivery tag 110, the identification tag 114, the server computers 104, and a scanner 202. In some examples, the devices may be connected via one or more networks 204 and/or 206 (e.g., via Bluetooth, WiFi, the Internet, or the like). In the architecture 200, one or more users 106 may utilize the user device 108 to interact with aspects of the delivery tag 110 via the one or more networks 204. The one or more users 106 may further interact with the server computers 104 and the scanner 202. In some examples, the user device 108, the delivery tag 110, and the server computers 104 may be configured or otherwise built as a single device. For example, the user device 108 and/or the delivery tag 110 may be configured to implement the embodiments described herein as a single computing unit, exercising the examples described above and below without the need for the other devices described.

In some examples, the networks 204, 206 may include any one or a combination of many different types of networks, such as cable networks, the Internet, wireless networks, cellular networks, satellite networks, other private and/or public networks, or any combination thereof. While the illustrated example represents the user device 108 accessing the server computers 104 via the networks 204, the described techniques may equally apply in instances where the user device 108 interacts with the server computers 104 over a landline phone, via a kiosk, or in any other manner. It is also noted that the described techniques may apply in other client/server arrangements (e.g., set-top boxes, etc.), as well as in non-client/server arrangements (e.g., locally stored applications, peer to peer configurations, etc.).

As noted above, the user device 108 may be configured to manage aspects of delivery of the package 112 to a customer. The user device 108 may be any type of computing device such as, but not limited to, a handheld delivery device, a mobile phone, a smartphone, a personal digital assistant (PDA), a laptop computer, a desktop computer, a thin-client device, a tablet computer, a wearable device, or the like. Additional details of the user device 108 are described herein with reference to FIG. 5.

As noted above, the delivery tag 110 may be configured to manage aspects of delivery of the package 112 to a customer. In some examples, the delivery tag 110 can be a shipping label that includes at least some electronic components and can be attached to the package 112. For example, the delivery tag 110 can include a passive RFID tag that is capable of storing certain information. In some examples, the delivery tag 110 can include an active tag (e.g., an active RFID tag) that includes additional computer components to enable the delivery tag 110 to receive information from other devices via the networks 204, 206, by using near-field communication technologies, by using radio-frequency signals, and/or in any other suitable manner. The components of the delivery tag 110 can also enable the delivery label to perform operations and provide information to other devices in the same or similar manners by which information is received (e.g., via the networks 204, 206, by using near-field communication technologies, by using radio-frequency signals, and/or in any other suitable manner). Additional details of examples of the delivery tag 110 are described herein with reference to FIGS. 6-7.

The server computers 104 may be any type of computing device such as, but not limited to, a server, a mobile phone, a smartphone, a PDA, a laptop computer, a desktop computer, a thin-client device, a tablet computer, etc. In some examples, the server computers 104 may be in communication with the user device 108 and/or the delivery tag 110 via the networks 204, 206, or via other network connections.

In one illustrative configuration, the server computers 104 may include at least one memory 208 and one or more processing units (or processor(s)) 210. The processor(s) 210 may be implemented as appropriate in hardware, computer-executable instructions, firmware, or combinations thereof. Computer-executable instruction or firmware implementations of the processor(s) 210 may include computer-executable or machine-executable instructions written in any suitable programming language to perform the various functions described.

The memory 208 may store program instructions that are loadable and executable on the processor(s) 210, as well as data generated during the execution of these programs. Depending on the configuration and type of the server computers 104, the memory 208 may be volatile (such as RAM) and/or non-volatile (such as ROM, flash memory, etc.). The server computers 104 may also include additional removable storage and/or non-removable storage 212 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 208 may include multiple different types of memory, such as SRAM, DRAM, or ROM. While the volatile memory described herein may be referred to as RAM, any volatile memory that would not maintain data stored therein once unplugged from a host and/or power would be appropriate. The memory 208 and the additional storage 212, both removable and non-removable, are both additional examples of non-transitory computer-readable storage media.

The server computers 104 may also contain communications connection(s) 214 that allow the server computers 104 to communicate with a data store, another computing device or server, user terminals and/or other devices via the networks 204, 206. The server computers 104 may also include I/O device(s) 216, such as a keyboard, a mouse, a pen, a voice input device, a touch input device, a display, speakers, a printer, etc.

Turning to the contents of the memory 208 in more detail, the memory 208 may include an operating system 218 and/or one or more application programs or services for implementing the features disclosed herein including a delivery management module 220a. In some examples, the delivery management module 220a may be configured to manage aspects of delivery of packages to customers. In some examples, the server computers 104 can include a user interface, which may include a graphical user interface, web-based applications, programmatic interfaces such as application programming interfaces (APIs), or other user interface configurations. The server computers 104 may also include a data store 222. In some examples, the data store 222 may include one or more data stores, databases, data structures, or the like for storing and/or retaining information associated with the server computers 104. For example, the data store 222 may include a customer information database 224, a delivery information database 226, and an agent information database 228.

The customer information database 224 can include any suitable information relating to customers (e.g., a type of user). For example, the server computers 104 may be associated with an electronic marketplace, and the customer information database 224 may include information describing customers of the electronic marketplace. In some examples, the customer information database 224 includes information about users to whom packages will be delivered. The information that can be included in the customer information database 224 can include contact information, location information (e.g., customer address, geocode, and the like), special delivery instructions (e.g., do not leave packages unattended), customer orders for items that are scheduled for delivery, historical information relating to customer orders, and any other information relating the customers or recipients of packages.

The delivery information database 226 can include any suitable information relating to executing delivery of packages to the customers and other recipients identified by the customer information database 224. For example, the delivery information database 226 can include active delivery routes, historical delivery routes, locations included in the delivery routes (e.g., geocodes, addresses, etc.), and any other suitable information relating to delivery routes. The delivery information database 226 can also include information associated with the delivery routes. For example, information describing movement ranges and geospatial boundaries that are associated with saved delivery routes. In some examples, the delivery routes are dynamically updated based on real-time conditions. For example, a delivery route may be updated based on weather conditions, traffic conditions, and any other suitable information.

The agent information database 228 can include any suitable information relating to delivery agents that execute delivery of packages to the customers and other recipients. For example, in the agent information database 228 can be stored identifiers that identify agents, delivery routes which the agents have been responsible for, incidents of lost or damaged packages, recorded incidents of packages being located outside a geospatial boundary, and the like. In some examples, at least a portion of the information retained in the agent information database 228 relating to positions of packages with respect to the geospatial boundary may be considered anomaly information. This may be because an incident of a package leaving the geospatial boundary may be considered an anomaly. In some examples, determination of an anomaly may depend on a total number of incidents recorded, a total number of incidents over a period of time, a duration of a particular incident, and the like.

Turning now to the scanner 202, the scanner 202 may include a particle scanner 230 and a card scanner 232. The scanner 202, including the particle scanner 230 and the card scanner 232, can be included in any suitable structure such as a turnstile, one or more opposing poles, a magnetic card reader, an overhead scanner, and the like. Generally, the scanner 202 can be located at a physical location that is frequented by the user 106. For example, the scanner 202 can be located at an entrance to a building where the user 106 is employed. In some examples, multiple ones of the scanner 202 can be located at multiple locations. For example, a delivery network can include many warehouses, fulfillment centers, delivery hubs, delivery stations, and the like where packages (e.g., the package 112) may pass through before they are delivered to customers. Multiple ones of the scanner 202 can be located at entrances of these locations. "Scanning" in to (and perhaps out of) these locations using employee identification cards (e.g., the identification tag 114) may be required as part of an existing security protocol. Such scanning can be achieved using the scanner 202. In addition to scanning in and out for security purposes, the scanner 202 can be utilized to detect and/or gather other information from users (e.g., the user 106) that pass through the scanner 202. For example, the card scanner 232 can be configured to collect anomaly information from the identification tag 114 as the user 106 scans the identification tag 114 at the card scanner 232. The anomaly information may have been collected by the identification tag 114 in accordance with techniques described herein.

As an additional example, the particle scanner 230 can be configured to detect the presence of a particular fluid, liquid, particle and/or dye. For example, as a fraud deterrent, in some examples, the delivery tag 110 can include a circuit that emits fluid under certain conditions. That fluid can be emitted on the user 106 and/or the identification tag 114 while the user 106 is away from the location where the scanner 202 is located. However, as the user 106 will invariably return to the location (e.g., to pick up more packages for delivery), when the user 106 passes by the scanner 202, the particle scanner 230 can scan the body of the user 106 and/or the identification tag 114. In some examples, the particle scanner 230 has more than one imaging device, sensor or antenna aligned in different directions in order to maximize scanning coverage. In some examples, the imaging devices, sensors or antennas may be configured to rotate relative to the user 106. For example, as part of a scanner protocol, the user 106 may step into the scanner 202, lift their arms above their head, and remain still for a fixed period of time. During this time, the particle scanner 230, the card scanner 232, and any other suitable scanner (e.g., a metal detector, body imaging scanner, etc.) can scan the user 106. Such scanning can include one or more imaging devices, sensors or antennas rotating relative to the user 106. The results of the scan (and any other scan described herein) can be provided to the server computers 104 via the network 204.

Figure 3:
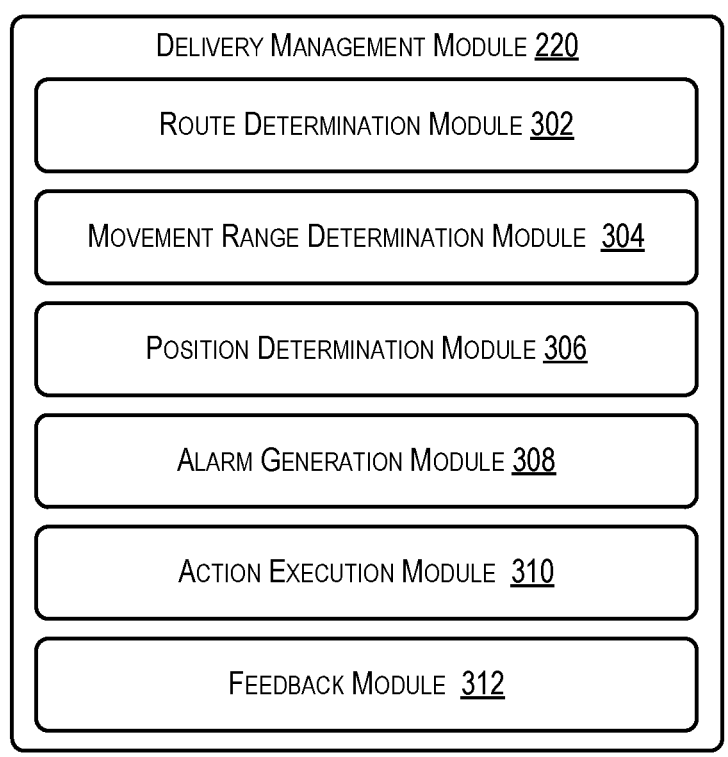
FIG. 3 is an example device for implementing techniques relating to tracking movements of delivery packages with respect to delivery movement ranges as described herein, according to at least one example.

FIG. 3 illustrates an example device 300 including the delivery management module 220. The delivery management module 220 may be configured to manage one or more sub-modules, components, and/or services directed to examples disclosed herein. In some examples, the delivery management module 220 may include a route determination module 302, a movement range determination module 304, a position determination module 306, an alarm generation module 308, an action execution module 310, and a feedback module 312. While these modules are illustrated in FIG. 3 and will be described as performing discrete tasks with reference to the flow charts, it is understood that FIG. 3 illustrates example configurations and other configurations performing other tasks and/or similar tasks as those described herein may be implemented according to the techniques described herein.

Generally, the route determination module 302 may be configured to determine delivery routes based on customer orders. For example, the route determination module 302 may receive information about a plurality of customer orders from an electronic marketplace. The plurality of orders may be located in the customer information database 224 or may be provided to the route determination module 302 using some other method. The route determination module 302 may, for each customer order, identify a delivery location, an expected delivery date or an expected delivery date and an expected delivery time, a geographic region associated with the delivery location, and any other suitable information. The route determination module 302 may also access information describing an allowable capacity of a delivery vehicle, and/or any other suitable information related to route planning. Using the identified and/or accessed information, the route determination module 302 may generate a delivery route that includes delivery directions (e.g., turn-by-turn directions) and delivery instructions (e.g., which packages go to which delivery locations). The delivery route can include deliveries associated with multiple orders and may be predetermined prior to a delivery agent, who is responsible for executing the delivery route, receiving the route.

Generally, the movement range determination module 304 may be configured to determine a movement range and/or a geospatial boundary based on the delivery route determined by the route determination module 302. The geospatial boundary may bound the movement range with the delivery route running through the movement range. Because delivery locations may be positioned away from the delivery route, the movement range may include areas where the delivery agent is expected to move, but which are apart from the delivery route.

Generally, the position determination module 306 may be configured to determine a position of a particular device or a delivery label using any suitable technique. For example, the position determination module 306 may be configured to receive location information from a Geospatial Positioning System (GPS) sensor and determine a position of the device including the GPS sensor of some other device communicating with the device that includes the GPS sensor. In some examples, the position determination module 306 may determine a position using multilateration of radio signals among one or more network towers and/or using any other suitable triangulation technique. The position determination module 306 may also be configured to determine when a device exits and/or enters the geospatial boundary and/or a position of the device with respect to the geospatial boundary. Thus, the position determination module 306 can detect an incident event (e.g., when the geospatial boundary is triggered by the device). In some examples, the position determination module 306 can record time information (e.g., a time stamp) associated with each position that it determines. In some examples, the time information can be used to compute a duration that the corresponding device has been located outside a geospatial boundary.

Generally, the alarm generation module 308 may be configured to generate an alarm in response to the position determination module 306 detecting one or more incident events (e.g., when a device is located outside the geospatial boundary) which can result in an anomaly event. In some examples, the alarms can include information about the anomaly event, instructions for execution by a different device relating to the alarm, and/or signals to other devices to perform certain actions (e.g., emit a fluid, modify a display area, etc.).

Generally, the action execution module 310 may be configured to execute one or more actions based on information received from the alarm generation module 308. For example, the action execution module 310 may be configured to cause a fluid circuit to emit a dye or liquid, cause a change in a modifiable display area, cause a laser writing device to cause a change in a modifiable display, cause information to be sent and/or stored, and any other suitable action.

Generally, the feedback module 312 may be configured to process and/or generate feedback based on information about the movements of devices and/or delivery agents while executing the delivery route. The feedback module 312 may include an analytics engine to process analytics relating to the delivery of packages. Such analytics can be received approximately in real-time and/or as historical information. The feedback module 312 may be used to generate one or more messages for presentation on a user device related to delivery of packages. For example, if it is determined that a delivery agent and/or a package in the agent's custody is located outside a geospatial boundary, the feedback module 312 may generate a message for presentation on the agent's handheld delivery device that instructs the agent to return to the delivery route, request input from the agent regarding traffic, weather or other conditions requiring the deviation from the delivery route, informs the agent that they will receive negative feedback if they do not return to the delivery route, and/or shares any other information.

Figure 4:
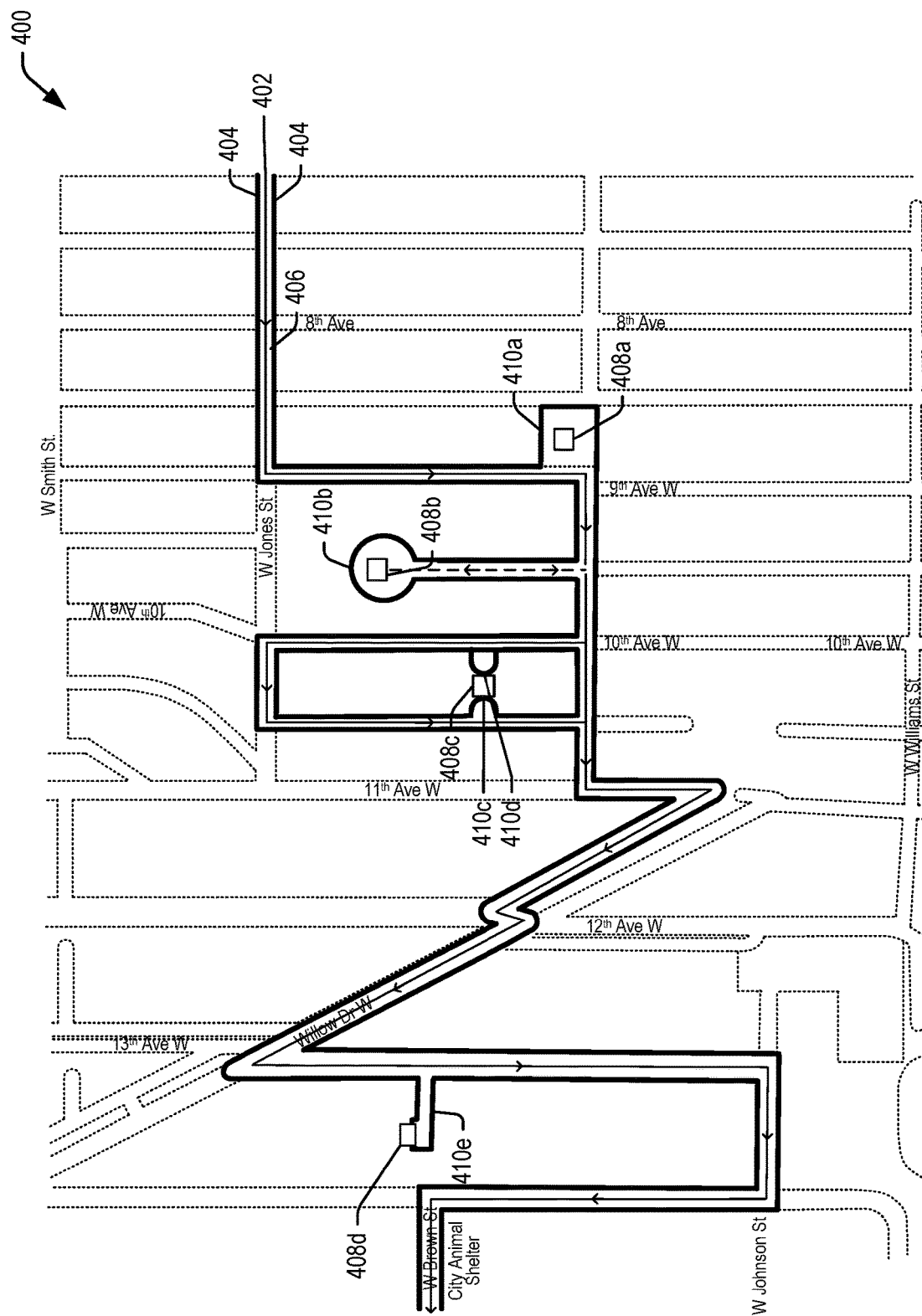
FIG. 4 is an example diagram depicting an example neighborhood in which techniques relating to tracking movements of delivery packages with respect to delivery movement ranges as described herein may be implemented, according to at least one example.

FIG. 4 illustrates a map 400 that illustrates a neighborhood in which techniques relating to tracking movements of delivery packages with respect to delivery movement ranges may be implemented, according to at least one example. The map 400 can include a delivery route 402 illustrated as a line with directional arrows, a geospatial boundary 404 illustrated as thicker lines that bound the delivery route 402, and a delivery movement range 406. The delivery route 402 may be considered an ordered set of nodes connected by a plurality of line segments. The nodes can include delivery locations, delivery stations, warehouses, and the like. The segments can connect the nodes and can include preferred segments, alternate segments, transportation segments, package-carrying segments, and the like. For example, the delivery route 402 may begin at a delivery station (not shown) prior to being routed through the neighborhood as illustrated by the map 400. The delivery route 402 may include a set of delivery directions for traveling to a set of delivery locations and a set of delivery instructions for delivering items at the set of delivery locations. At least a portion of the delivery instructions and/or delivery directions can be processed by a computing device to produce visual elements, human-readable instructions, and the like. The delivery route 402 may be generated using any suitable technique, including any of those discussed herein. Thus, the delivery route 402 can include one or more delivery locations 408a-408d (e.g., single family homes, apartments, condos, places of business, etc.). In some examples, each of the delivery locations 408 is associated with a customer address and may be represented as a geocode in the delivery route. In some examples, as part of generating the delivery route 402, a computing device translates a set of customer addresses to a set of geocodes corresponding to the set of customer addresses.

The delivery movement range 406 is an area in which a delivery agent, and packages in the delivery agent's custody, is expected to travel while delivering the packages. In this manner, the delivery movement range 406 may correspond to roadways, driveways, drop-off locations at delivery locations, alternate routes, and the like. The delivery movement range 406 can include the geospatial boundary 404 and a set of geospatial geolocation boundaries 410a-410e. The geospatial boundary 404 together with the set of geospatial geolocation boundaries 410a-410e may form of a virtual boundary such as a geo-fence that defines a geographic area. The geographic area associated with the geospatial boundary 404 and the geospatial geolocation boundaries 410a-410e can be provided to one or more devices to determine positions of the one or more devices or other items with respect to the geospatial boundary 404 and the geospatial geolocation boundaries 410a-410e (e.g., within the boundary, outside the boundary, a distance away from the boundary, etc.). The geospatial boundary 404 can correspond to the delivery route 402 and/or the set of delivery directions. The set of geospatial geolocation boundaries 410a-410e can correspond to the set of delivery locations 408a-408d and/or the set of delivery instructions.

In some examples, certain ones of the delivery locations 408a-408d may have specific geospatial geolocation boundaries 410a-410e. For example, because a package may be delivered to the delivery location 408a at any one of four doors on the four sides of the delivery location 408, the geospatial geolocation boundary 410a may be larger than other geospatial geolocation boundaries 410. As an additional example, because the delivery location 408b may be located at the end of a street in a cul-de-sac, a delivery vehicle may not be capable of driving up to the delivery location 408b. Thus, the delivery route 402 can indicate (in dashed lines in the map 400) that the delivery agent needs to carry the package towards the delivery location 408b. As an additional example, because the delivery location 408c can be accessed from either of two different streets, the delivery route 402 can compute the delivery route 402 accordingly. In addition, the geospatial geolocation boundaries 410c and 410d can account for the two possible access points for reaching the delivery location 408c. While illustrated as corresponding to the road rights-of-way, the delivery movement range 406 and the geospatial boundary 404 and geospatial geolocation boundaries 410a-410e can be larger and/or smaller than illustrated to include a greater or smaller area, and/or one or more alternate routes.

Figure 5:
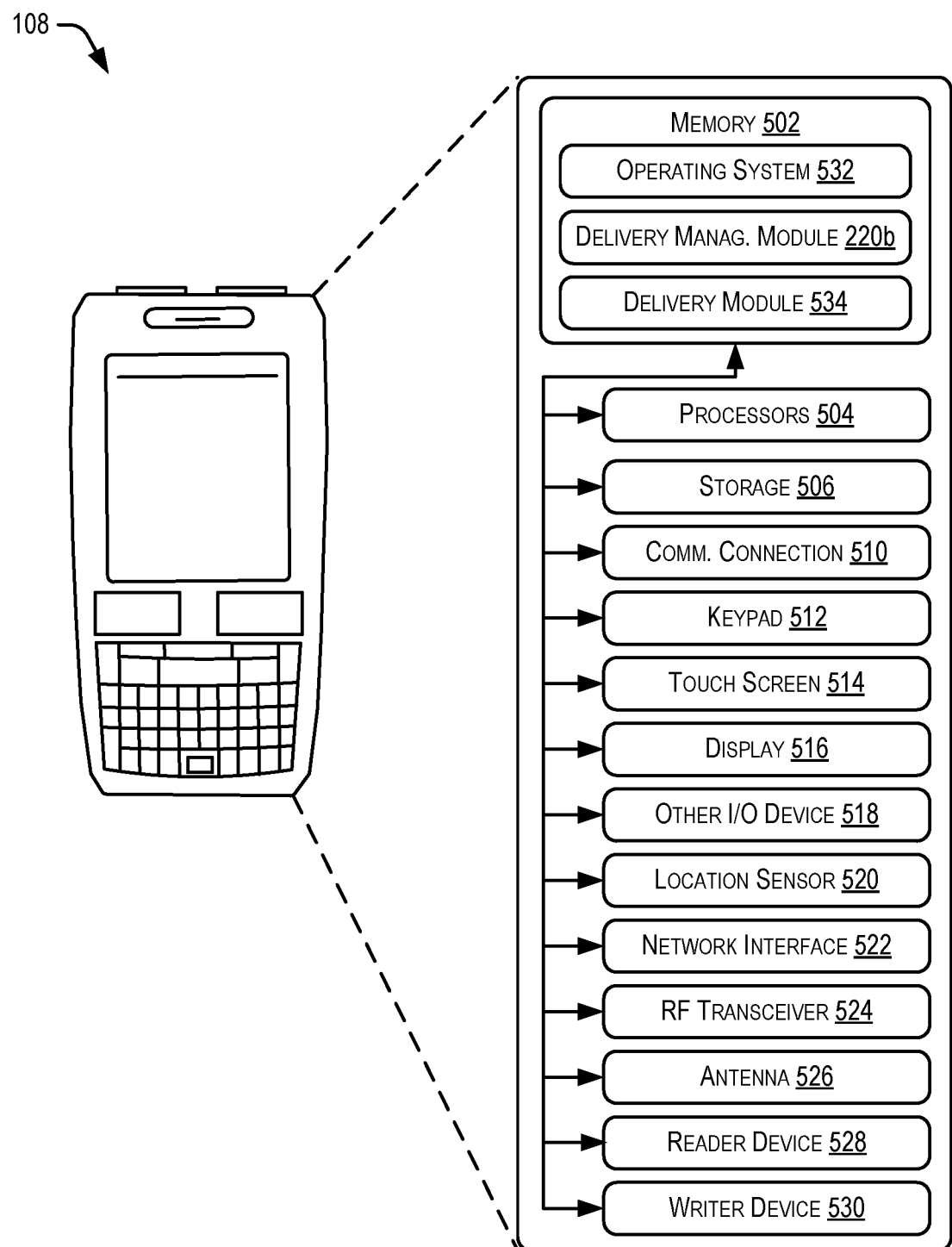
FIG. 5 is an example user device for implementing techniques relating to tracking movements of delivery packages with respect to delivery movement ranges as described herein, according to at least one example.

FIG. 5 illustrates a schematic representation of the user device 108 for implementing techniques relating to tracking movements of delivery packages with respect to delivery movement ranges, according to at least one example. The user device 108 can include at least one memory 502 and one or more processing units (or processor(s)) 504. The processor(s) 504 may be implemented as appropriate in hardware, computer-executable instructions, firmware, or combinations thereof. Computer-executable instruction or firmware implementations of the processor(s) 504 may include computer-executable or machine-executable instructions written in any suitable programming language to perform the various functions described.

The memory 502 may store program instructions that are loadable and executable on the processor(s) 504, as well as data generated during the execution of these programs. Depending on the configuration and type of the user device 108, the memory 502 may be volatile (such as random access memory (RAM)) and/or non-volatile (such as read-only memory (ROM), flash memory, etc.). The user device 108 may also include additional removable storage and/or non-removable storage 506 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 502 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 502 and the additional storage 506, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 502 and the additional storage 506 are both examples of non-transitory computer storage media. Additional types of computer storage media that may be present in the use device 108 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 108. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 108 may also include communications connection(s) 510 that allow the user device 108 to communicate with a data store, another computing device or server, user terminals, and/or other devices via the networks 204, 206. The user device 108 may also include I/O device (s), such as a keypad 512, a touch screen 514, a display 516, and other I/O devices 518 (e.g., a mouse, a pen, a voice input device, speakers, a printer, etc.). For example, the keypad 512 may include a button that, when pressed, indicates that a package has been "delivered." In some examples, the button may be presented as a user interface element on the display 516 and interacted with via the touch screen 514.

The user device 108 may also include a location sensor 520, a network interface 522, an radio-frequency (RF) transceiver 524, and an antenna 526. The location sensor 520 can include any sort of sensor that informs the user device 108 of its geolocation including, but not limited to, Global Positioning System (GPS) based on satellites circling the Earth. The location sensor 520 may additionally or alternatively determine geolocation by radio signal triangulation (e.g., triangulation based on radio antenna signal strength), or receiving a notification from a fixed location (e.g., a beacon signal broadcasting a location).

The network interface 522 may be configured for wirelessly communicating with the networks 204, 206. The network interface 522 may use any standard protocols for network communication. In some examples, the network interface 522 may use the antenna 526 to send and receive data from the networks 204, 206. In some examples, the network interface 522 may provide information to the location sensor 520 (e.g., a closest network access point) from which the location sensor 520 can infer or calculate a location of the user device 108.

The RF transceiver 524 may be configured to transmit and receive RF signals. For example, the RF transceiver 524 can function communicate with passive and/or active RFID tags or other devices capable of receiving and/or providing information via RF signals.

The user device 108 may also include a reading device 528 and a writing device 530. The reading device 528 may be configured to read a variety of different human-readable and machine-readable elements. For example, the reading device 528 can include an optical scanner configured to read barcodes. The reading device 528 can also include an RFID reader configured to read RFID tags, which may not require an optical line of sight. The writing device 530 may be configured to write physical information on any suitable substrate. For example, the writing device 530 may include an excimer laser transmitter configured to etch, mark, or otherwise write information on a portion of the delivery tag 110 that includes a laser-reactive substrate or photo-sensitive substrate. In some examples, a machine-readable element such as a barcode can be written to the delivery tag 110 during printing of the label, and the writing device 530 may modify a portion of the machine-readable element later as part of implementing the techniques described herein. In some examples, the writing device 530 may alter one or more physical characteristics of the substrate. In some examples, the writing device 530 may include any suitable lamp that may alter one or more physical characteristics of the substrate when the lamp illuminates a portion of the substrate.

Turning to the contents of the memory 502 in more detail, the memory 502 may include an operating system 532 and/or one or more application programs or services for implementing the features disclosed herein including the delivery management module 220*b* and a delivery module 534. In some examples, the delivery management module 220*b* may be configured as described herein. In some examples, the delivery module 534 may be configured to manage certain operational aspects of the user device 108. For example, the delivery module 534 may be configured to manage the reading device 528 and the writing device 530. The operating system 532, the delivery management module 220*b* and/or the delivery module 534 may include functionality to process and interact with delivery routes, delivery instructions, delivery directions, and the like.

Figure 6:
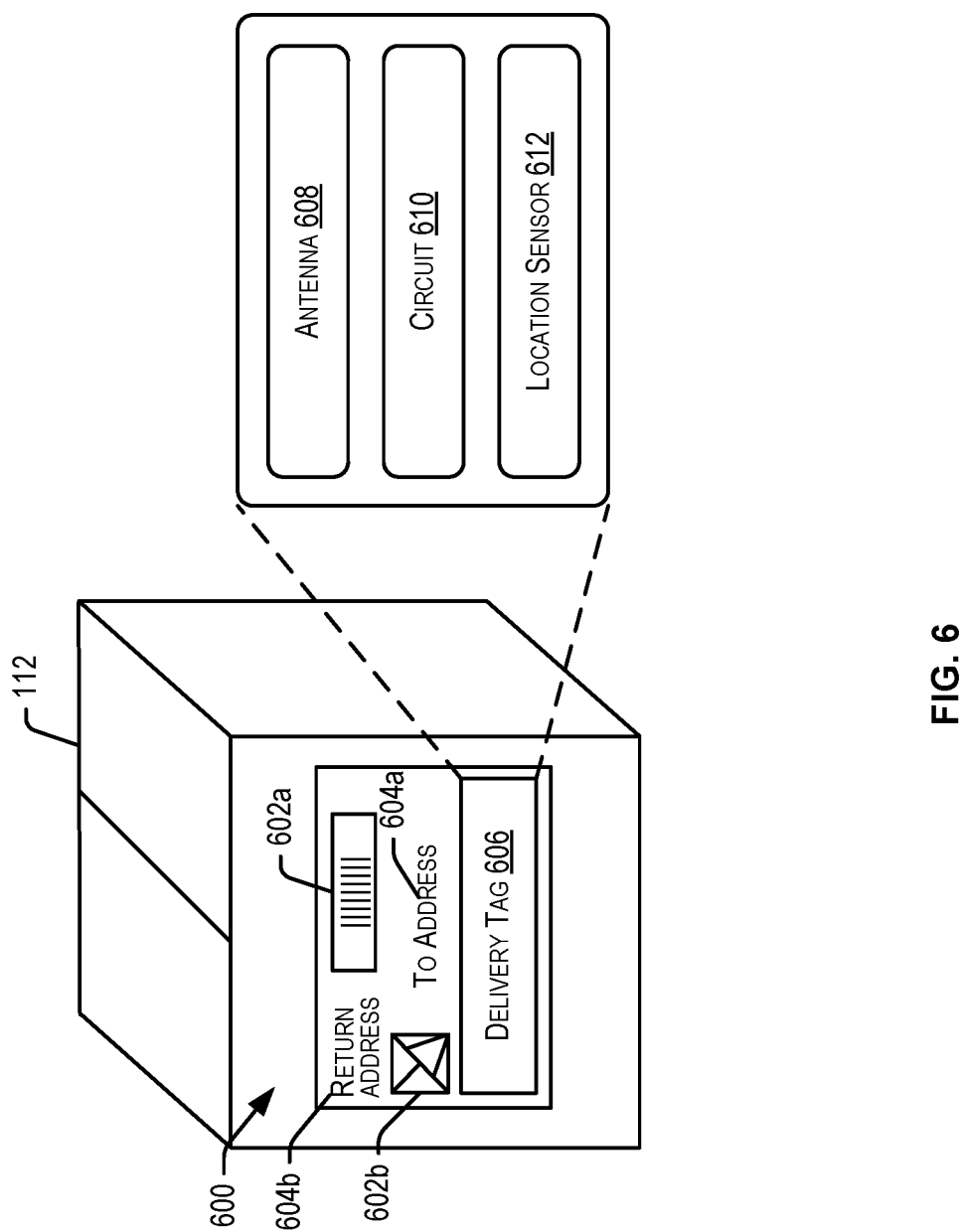
FIG. 6 is a diagram including an example delivery label and an example package related to implementing techniques relating to tracking movements of delivery packages with respect to delivery movement ranges as described herein, according to at least one example.

FIG. 6 illustrates a schematic representation of a delivery label 600 attached to the package 112 for use in accordance with techniques relating to tracking movements of delivery packages with respect to delivery movement ranges, according to at least one example. The delivery label 600 may be formed in any suitable manner such as by printing or rolling. The delivery label 600 can include an adhesive structure that is configured to retain the delivery label 600 to the package 112. The delivery label 600 can include one or more machine-readable elements 602*a*-602*b*. The one or more machine-readable elements 602 may include dimensions having any suitable number of dimensions (e.g., two-dimensional, three-dimensional, etc.). In some examples, the machine-readable elements 602 also include a portion that is human-readable. The delivery label 600 can also include one or more human-readable elements 604*a*-604*b* illustrated as a "return address" and a "to address". The label can also include a delivery tag 606. The delivery tag 606 is an example of the delivery tag 110. The delivery tag 606 can be formed in any suitable manner which may take place before, after, or during forming of the delivery label 600. The delivery tag 606 can include a passive RFID tag that includes encoded information such as a unique customer order IDs, tracking IDs, the delivery location associated with the package 112, the customer address associated with the package 112, and any other suitable information. To this end, the delivery tag 606 can include an antenna 608, a circuit 610, and a location sensor 612. The circuit 610 can include any suitable components to enable the delivery tag 606 to communicate with the user device 108 and other suitable devices. For example, the circuit 610 may send information via the antenna 608 to the user device 108 and/or the identification tag 114 and receive information from these devices via the antenna 608. The location sensor 612 may be configured to identify a position of the delivery tag 606 (and most likely a position of the package 112). The location sensor 612 and the circuit 610 may receive power when a power source is nearby (e.g., from an RFID reader that interrogates the delivery tag 606). In some examples, the delivery tag 606 can include, within the circuit 610 or otherwise, a transmitter and/or a wireless beacon. In other examples, the delivery tag 606 can be a different type of passive tag such as one or two dimensional barcode. In some examples, the delivery tag 606 includes a structure to enable it to adhere to the package 112 and/or the delivery label 600. In some examples, the structure is also configured to hold the antenna 608, the circuit 610, and the location sensor 612. For example, the structure can be a flexible printed circuit that includes the components of the delivery tag 606 attached and/or printed therein.

Figure 7:
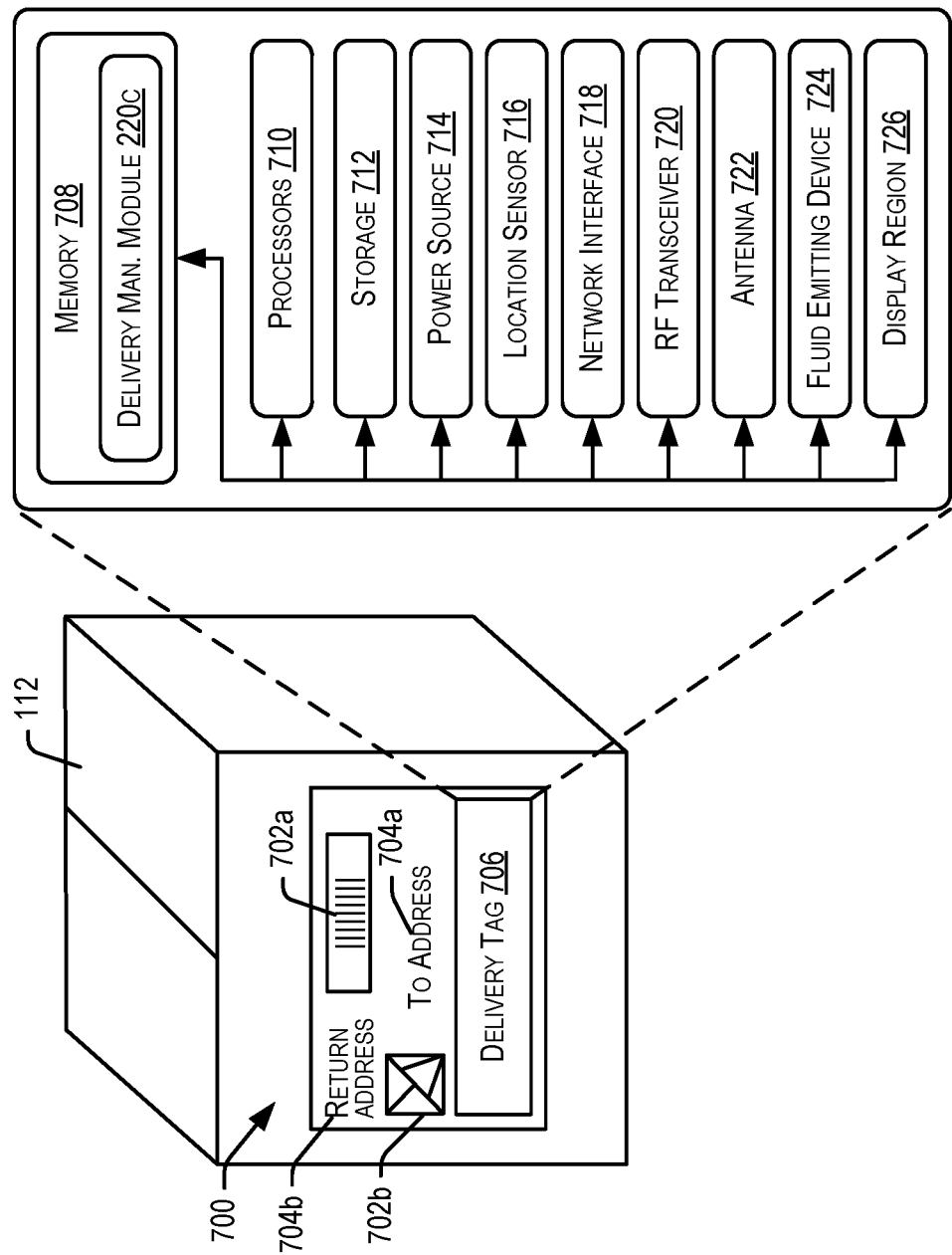
FIG. 7 is a diagram including an example delivery label and an example package related to implementing techniques relating to tracking movements of delivery packages with respect to delivery movement ranges as described herein, according to at least one example.

FIG. 7 illustrates a schematic representation of a delivery label 700 attached to the package 112 for use in accordance with techniques relating to tracking movements of delivery packages with respect to delivery movement ranges, according to at least one example. The delivery label 700 may be formed in any suitable manner such as by printing or rolling. The delivery label 700 can include an adhesive structure that is configured to retain the delivery label 700 to the package 112. Like the delivery label 600, the delivery label 700 can include one or more machine-readable elements 702a-702b, one or more human-readable elements 704a-704b, and a delivery tag 706. The delivery tag 706 is an example of the delivery tag 110. The delivery tag 706 can be formed in any suitable manner which may take place before, after, or during forming of the delivery label 700. The delivery tag 706 can include an active RFID tag that includes encoded information such as a unique customer order IDs, tracking IDs, the delivery location associated with the package 112, the customer address associated with the package 112, and any other suitable information The delivery tag 706 can include at least one memory 708 and one or more processing units (or processor(s)) 710. The processor(s) 710 may be implemented as appropriate in hardware, computer-executable instructions, firmware, or combinations thereof. Computer-executable instruction or firmware implementations of the processor(s) 710 may include computer-executable or machine-executable instructions written in any suitable programming language to perform the various functions described.

The memory 708 may store program instructions that are loadable and executable on the processor(s) 710, as well as data generated during the execution of these programs. Depending on the configuration and type of the delivery tag 706, the memory 708 may be volatile (such as random access memory (RAM)) and/or non-volatile (such as read-only memory (ROM), flash memory, etc.). The delivery tag 706 may also include additional removable storage and/or non-removable storage 712, which may provide non-volatile storage of computer-readable instructions, data structures, program modules, and other data for the computing devices. Turning to the contents of the memory 708 in more detail, the memory 708 may include one or more application programs or services for implementing the features disclosed herein including the delivery management module 220c.

The delivery tag 706 can also include a power source 714 configured to provide power to components of the delivery tag 706. The delivery tag 706 may also include a location sensor 716, a network interface 718, a radio-frequency (RF) transceiver 720, and an antenna 722. The location sensor 716 can include any sort of sensor that informs the delivery tag 706 of its geolocation including, but not limited to, a Global Positioning System (GPS) based on satellites circling the Earth. The location sensor 716 may additionally or alternatively determine geolocation by radio signal triangulation (e.g., triangulation based on radio antenna signal strength), or receiving a notification from a fixed location (e.g., a beacon signal broadcasting a location).

The network interface 718 may be configured for wirelessly communicating with the networks 204, 206. The network interface 718 may use any standard protocols for network communication. In some examples, the network interface 718 may use the antenna 722 to send and receive data from the networks 204, 206. In some examples, the network interface 718 may provide information to the location sensor 716 (e.g., a closest network access point) from which the location sensor 716 can infer or calculate a location of the delivery tag 706.

The RF transceiver 720 may be configured to transmit and receive RF signals. For example, the RF transceiver 720 can function to communicate with passive and/or active RFID tags or other devices capable of receiving and/or providing information via RF signals.

The delivery tag 706 may also include a fluid emitting device 724 and a modifiable display region 726. The fluid emitting device 724 can be configured to emit a fluid or dye in response to a signal. In some examples, the fluid emitting device 724 can include a control chip coupled to a fluid reservoir. In some examples, the fluid reservoir may include two chambers separated by a membrane. A first chamber may be filled with a fluid or a dye. The second chamber can include a pressurized gas. When a gate is opened on the reservoir and/or when the membrane is breached, the pressurized gas may force the fluid or dye out of the reservoir. In some examples, the fluid reservoir may be a pressurized capsule electrically connected to the control chip. Opening the pressurized capsule can be achieved in any suitable manner such as, for example, using a particular current, using a particular voltage, using heat, or in any other suitable manner. In some examples, the fluid emitting device 724 can include a pump, sprayer, or other suitable device to emit the fluid or dye. In some examples, the fluid may be retained on or around the control chip (e.g., without use of a reservoir). For example, the control chip can include one or more electrical connections and one or more fluidic connections. In some examples, the fluid emitting device 724 can include a fluid channel in which fluid may be retained. In some examples, techniques relating to micro-electro-mechanical systems (MEMS) may be used to form the fluid emitting device 724. The dye can be invisible to the naked eye and odorless, as well as innocuous and non-toxic, such that when the dye is emitted on or toward the user 106 (e.g., a delivery agent), the user 106 is unaware of its emission. The dye may be unique to the delivery tag 706 such that when the dye is later detected, it may be tied back to the delivery tag 706 from which it originated. In this manner, the dye may assist owners in unique identification. In some examples, the dye may be based on plant-based deoxyribonucleic acid (DNA). For example, the dye may be manufactured using plant DNA to produce a variety of unique strings. In some examples, the strings may be unique to a batch of delivery tags 706, a delivery route, a delivery agent, and the like.

In some examples, the modifiable display region 726 may be a portion of the delivery tag 706 that includes a plurality of barcodes printed using lenticular printing technology. The plurality of barcodes can be combined in the modifiable display region 726 such that only one barcode is visible and readable at any one time, but such that the other barcodes can be made visible and readable at other times when a signal is applied to the modifiable display region 726. In this manner, the modifiable display region 726 can be multi-phased, with the number of phases corresponding to the number of barcodes in the plurality. By applying a signal to the modifiable display region 726 (e.g., from a microchip that includes same components of the tag 706), the barcodes can flip between each other. In some examples, the barcodes can be referred to as images with identification information included therein. In a three-phase lenticular image, there may be included Image 1, Image 2, and Image 3. The three images can be tightly morphed together so that physically only one image is seen or scanned at any point in time regardless of the viewing angle. Each image, or a particular image to be displayed at a particular time, may be controlled by a microchip of the delivery tag 706 (e.g., associated with the modifiable display region 726). In some examples, the lenticular image may include only two phases or more than three phases.

In some examples, the modifiable display region 726 may be a portion of the delivery tag 706 that includes at least a portion of material that has been treated with a photo-sensitive substance or formed from a photo-sensitive material. For example, the modifiable display region 726 can include an indicator region and a barcode region, each of which can be placed in the photo-sensitive material. Within the barcode region can be printed or etched a barcode and the indicator region may be blank. If it is determined that the delivery tag 706 has moved outside of a movement boundary, the writer device 530, e.g., a laser, of the user device 108 may be instructed to write an indicator (e.g., a flag, a marking, a letter, or the like) in the indicator region. In some examples, the laser is instructed in response to a command to scan the barcode region and mark the package 112 as "delivered." Later, when the barcode region is scanned (or as part of the same scan), the reader can also read the indicator in the indicator region that was written using the laser. The indicator will indicate that the delivery tag 706 has moved outside the movement boundary. In some examples, modifying a barcode can include adding features to the barcode to create a different version of the barcode. In this manner, the modifiable display region 726 may be modified.

In some examples, the modifiable display region 726 may include a plurality of barcodes and a suitable mechanism for cycling through the plurality of barcodes. For example, the mechanism may be a combination of gears coupled to miniature motor. In some examples, the modifiable display region 726 can be modified from a first barcode to a second barcode by causing the miniature motor to engage the combination of gears to rotate from the first barcode to the second barcode. In some examples, the plurality of barcodes may be printed (e.g., on a piece of paper), with two opposing ends of which being attached to each of two cylindrical drums or spools. Changing between any two barcodes may include unraveling one spool while raveling the other spool to reveal information printed on the other parts of the paper.

FIGS. 8, 9, 10, 11, and 12 illustrate example flow diagrams showing respective processes 800, 900, 1000, 1100, and 1200 as described herein. These processes 800, 900, 1000, 1100, and 1200 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 8:
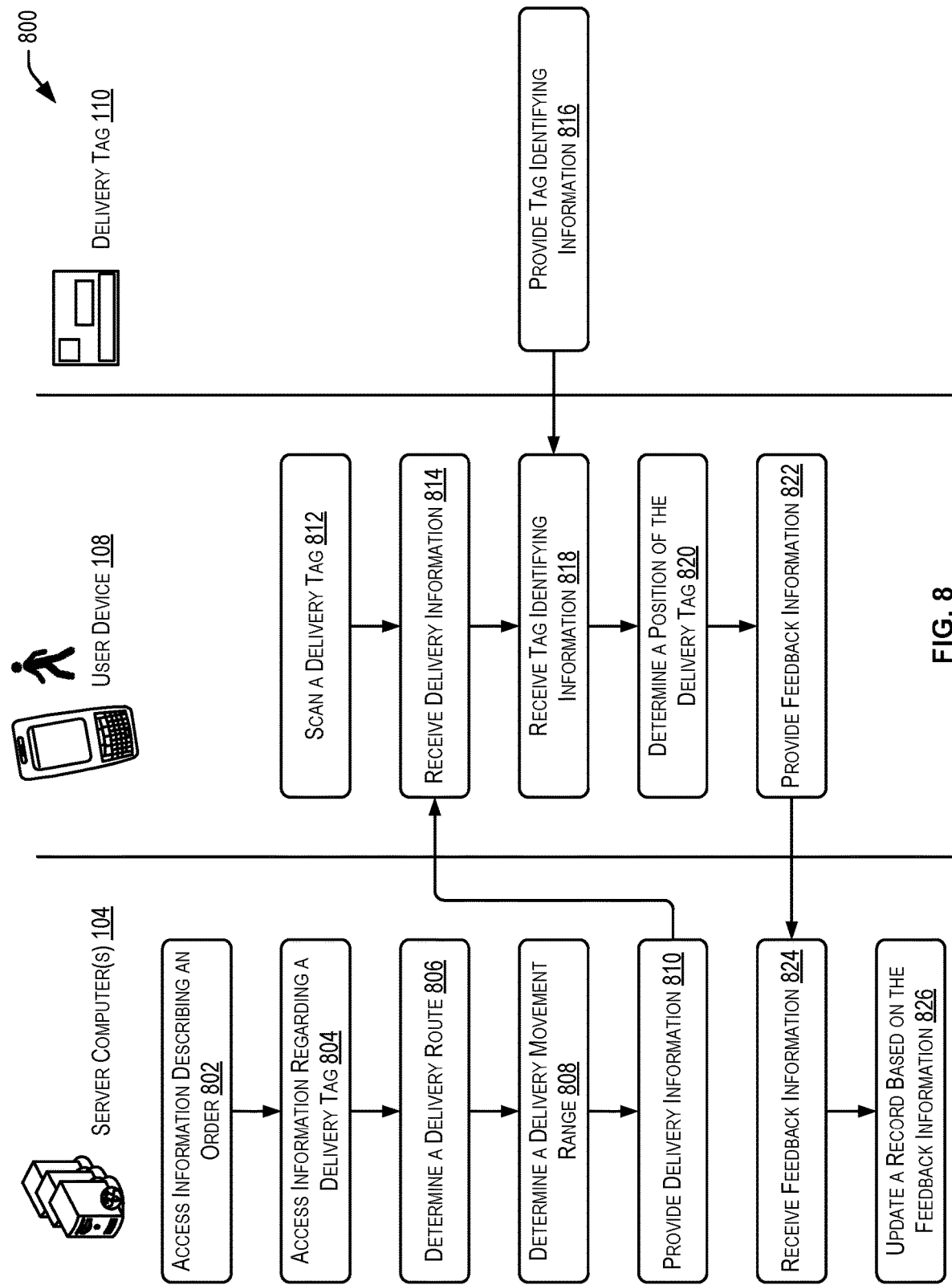
FIG. 8 is a flow diagram depicting example acts for implementing techniques relating to tracking movements of delivery packages with respect to delivery movement ranges as described herein, according to at least one example.

FIG. 8 depicts the process 800 including example acts or techniques relating to tracking movements of delivery packages with respect to delivery movement ranges, according to at least one example. The delivery management module 220, whether embodied in the server computers 104, the user device 108, the delivery tag 110, or any suitable combination of the foregoing may perform the process 800 of FIG. 8.

The process 800 begins at 802 by accessing information describing an order. This can be performed by the route determination module 302 (FIG. 3) executing in the server computers 104. Accessing the information can include retrieving the information (e.g., from a database) or receiving the information from a different system. The order may have been received from a customer and may be for an item. The order may identify a location for delivery of the item to the customer.

At 804, the process 800 includes accessing information regarding a delivery tag, which can be a passive tag as described in FIG. 6. This can be performed by the route determination module 302 executing in the server computers 104. Accessing the information can include retrieving the information (e.g., from a database) or receiving the information from a different system. The delivery tag may be associated with the order and attached to the item or a package that includes the item.

At 806, the process 800 includes determining a delivery route. This can be performed by the route determination module 302 executing in the server computers 104. Determining the delivery route may be based at least in part on the location for delivery. The delivery route may begin at a transportation node of a delivery network and include a set of locations. The set of locations can include the location from 802 and other locations for delivery of other items to other customers. Thus, the delivery route can include multiple delivery locations for multiple items.

At 808, the process 800 includes determining a delivery movement range. This can be performed by the movement range determination module 304 (FIG. 3) executing in the server computers 104. The delivery movement range may be determined based at least in part on the delivery route. For example, the delivery route may be represented by a set of directions that would allow a delivery vehicle to travel to each of the delivery locations. The delivery movement range may represent an area that includes the delivery route. In some examples, the delivery movement range can be determined based on a set of parameters (e.g., entry point to property where delivery location is located, characteristics of delivery vehicle, characteristics of delivery locations, characteristics of area surrounding the delivery route, and any other suitable parameter). For example, certain parameters may indicate how to construct the delivery movement range based on aspects of the computed delivery route. For example, if all of the delivery locations are on one side of a particular street, the parameters may indicate that the delivery movement range extend from the middle or from the far edge of the street and include the front door steps of the homes corresponding to the delivery locations. If the delivery locations are located on both sides of the street, the parameters may indicate that the delivery movement range extend from front door steps to front door steps of homes on both sides of the street. The delivery movement range may be dynamically updated based on weather conditions, road conditions, traffic conditions, construction, order changes and the like. During the time when the delivery movement range is updating, a delivery agent may be instructed to stop a delivery vehicle to avoid inadvertently triggering the geospatial boundary discussed herein, or alternatively, any triggering of the geospatial boundary during an update of the delivery movement range may be deactivated or disregarded.

The delivery movement range can include a geospatial boundary that corresponds to the delivery route and a set of geospatial geolocation boundaries that corresponds to the location and the other locations included in the delivery route. The geospatial boundary and the set of geospatial geolocation boundaries may together form a geo-fence or virtual barrier, which can be used to determine whether the delivery tag moves outside the delivery movement range, where the movement occurs, and when.

At 810, the process 800 includes providing delivery information. This can be performed by the movement range determination module 304 executing in the server computers 104. The delivery information can include a portion of the delivery route and a portion of the delivery movement range. In some examples, the delivery information can be provided to a handheld device configured to manage aspects of delivery of the package. The handheld device may also be configured to at least receive information from the delivery tag at least during transportation of the package and/or item to the location.

At 812, the process 800 includes scanning a delivery tag. This can be performed by the delivery module 534 (FIG. 5) executing in the user device 108. Scanning the delivery tag can associate the delivery tag with the user device 108 and the user 106. In some examples, scanning of the delivery tag can take place when the package is initially transferred in custody to the user 106. The user 106 may be the final actor in the chain of custody corresponding to delivery of the package at the delivery location. In some examples, this may be referred to as a final mile or last mile delivery.

At 814, the process 800 includes receiving the delivery information. This can be performed by the movement range determination module 304 executing in the user device 108. The delivery information can be received from the server computers 104. In some examples, the delivery information can include a portion of the delivery route and a portion of the delivery movement range. The delivery information may be received in response to the scanning of the delivery tag at 812. In some examples, the delivery information is received after all delivery tags associated with the delivery route have been scanned.

At 816, the process 800 includes providing tag identifying information. This can be performed by the delivery tag 110, e.g., in response to receiving an interrogating RF signal from the RF transceiver 524 of the user device 108. The tag identifying information can be received at 818 by the user device 108, e.g., via the RF transceiver 524. This can be performed by the position determination module 306 (FIG. 3) executing in the user device 108. The tag identifying information may at least identify the delivery tag and any other suitable information. For example, the tag identifying information may identify aspects of an order (e.g., order ID number, customer number, a delivery location associated with the order, and the like). In some examples, the tag identifying information may also identify a geolocation of the delivery tag, or at least information to enable the user device 108 to determine a position of the delivery tag at 820.

At 820, the process 800 includes determining the position of the delivery tag. This can be performed by the position determination module 306 executing in the user device 108, e.g., using information from the location sensor 520. In some examples, determining the position can include accessing information indicating a known distance between the delivery tag 110 and the user device 108, and using such information in connection with a geolocation of the user device 108 to determine the position. In some examples, the position may be relative to the delivery movement range. For example, this can include simply determining whether the position is within the range or outside the range. In some examples, the position may be a specific geolocation with coordinates that can be compared to the coordinates of the delivery movement range to determine whether the position is outside the range. In some examples, the user device 108 may also detect, based on the position, that the delivery tag 110 is located or has been located outside the delivery movement range. This information can be bundled and generically referred to as anomaly information and/or feedback information. In some examples, movement of the delivery tag 110 outside the delivery movement range may be considered anomalous or an anomaly when it is determined that the delivery tag 110 has been located outside the delivery movement range in excess of a threshold number of times, in excess of a duration threshold for any one time, in excess of a cumulative duration threshold, in excess of a distance threshold from the delivery movement range, and/or in excess of any other thresholds. Prior to the movement being characterized as anomalous or an anomaly, the movement may be considered an incident. Thus, many incidents may result in an anomaly, a single incident for an extended period of time, or a few incidents each for a certain period of time may cross one or more thresholds and be considered anomalies.

In some examples, the user device 108 may send an RF signal to the delivery tag 110, and based on a response from the delivery tag 110, the user device 108 may determine a distance between delivery tag 110 and the user device 108. This distance can be used to determine the position of the delivery tag 110. In some examples, once it is detected that the position of the delivery tag 110 is outside the geospatial boundary or has been outside the geospatial boundary (e.g., in excess of some threshold), the alarm generation module 308 can be initiated to generate an alarm. Information about the alarm can be shared with the server computers 104 and stored in association with the delivery agent who is responsible for delivery. In some examples, the information about the alarm may indicate the conditions that caused the alarm to be generated (e.g., geographic information about the position of the delivery tag 110 and time stamp information about when the delivery tag 110 exited the geospatial boundary and when, if ever, it returned).

In some examples, in response to the alarm being generated, the action execution module 310 can be initiated. The action execution module 310 can be configured to perform one or more actions relating to the alarm. For example, the action execution module 310 may cause one or more components of the delivery tag 110 to perform an action (e.g., cause a fluid emitting device to release a fluid or cause a display region to be modified). In some examples, the action execution module 310 may generate one or more messages displayable on a display of the user device 108. Such messages may provide useful information to the delivery agent. For example, the messages may indicate that the delivery tag 110 is outside the geospatial boundary and that the delivery agent should re-enter the boundary. The message may include directions for re-entering the boundary. In some examples, the action execution module 310 may initiate a process by which the delivery agent can indicate why the delivery tag 110 is/has been outside the geospatial boundary. For example, a message indicating that the delivery tag 110 is/has been outside the boundary may be generated and provided to the user device 108. The message may include a set of options for responding. By these options, the delivery agent may indicate her actual location, input text relating to why the delivery tag 110 is/has been located outside the geospatial boundary, etc. Such responses can be used to assess the characteristics of the geospatial boundary, performance of the delivery agent, and monitor other delivery-related metrics.

At 822, the process 800 includes providing the feedback information. This can be performed by the feedback module 312 (FIG. 3) executing in the user device 108. This can be provided via a network and in accordance with a schedule (e.g., at the end of a shift), in response to certain events (e.g., detection of an incident or an anomaly), periodically (e.g., every hour), or in any other manner.

At 824, the process 800 includes receiving the feedback information. This can be performed by the feedback module 312 executing in the server computers 104. The feedback information can be received from the user device 108.

At 826, the process 800 includes updating a record based on the feedback information. This can be performed by the feedback module 312 executing in the server computers 104. The record can be a record of the delivery agent associated with the delivery tag 110 and the package to which the delivery label is attached. Thus, the record may be updated to include any incidents and/or anomalies determined between when the agent scanned the delivery tag at 812 and when the agent marked the package as delivered, or if the agent never marked the package as delivered, then when the delivery agent returned to the transportation node. The record can be located in the agent information database 228.

Figure 9:
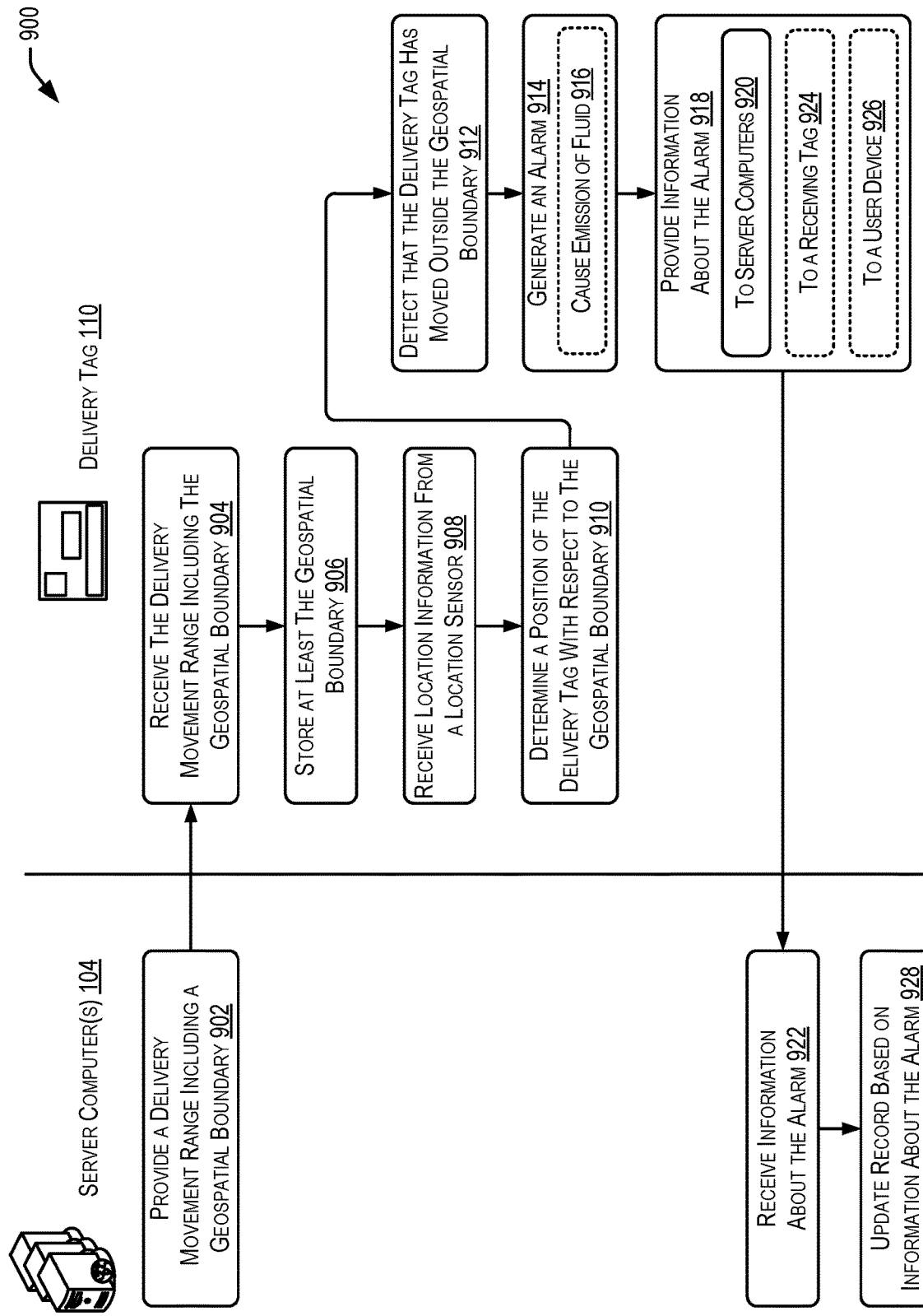
FIG. 9 is a flow diagram depicting example acts for implementing techniques relating to tracking movements of delivery packages with respect to delivery movement ranges as described herein, according to at least one example.

FIG. 9 depicts the process 900 including example acts or techniques relating to tracking movements of delivery packages with respect to delivery movement ranges, according to at least one example. The delivery management module 220, whether embodied in the server computers 104, the delivery tag 110, or any suitable combination of the foregoing may perform the process 900 of FIG. 9.

The process 900 begins at 902 by providing a delivery movement range including a geospatial boundary. This can be performed by the movement range determination module 304 (FIG. 3) executing in the server computers 104. In some examples, the server computers 104 may have previously computed the delivery movement range and the geospatial boundary based at least in part on a delivery route.

At 904, the process 900 includes receiving the delivery movement range including the geospatial boundary. This can be performed by the movement range determination module 304 executing in the delivery tag 110, which can be an active tag as described in FIG. 7.

At 906, the process 900 includes storing at least a portion of the geospatial boundary. This can be performed by the movement range determination module 304 executing in the delivery tag 110. Storing the geospatial boundary can include storing in memory and/or additional storage of the delivery tag 110. Storing the geospatial boundary may enable the delivery tag 110 to have access to the geospatial boundary when at a later time the delivery tag 110 determines its location with respect to geospatial boundary.

At 908, the process 900 includes receiving location information from a location sensor. This can be performed by the position determination module 306 (FIG. 3) executing in the delivery tag 110. The location sensor may be local to the delivery tag 110 and/or within some other device. For example, the location information may be received from the user device 108. In any event, the location information may identify a geographic location of the delivery tag 110. The geographic location may be represented in any suitable convention such as, for example, coordinates, latitudes and longitudes, street address, etc.

At 910, the process 900 includes determining a position of the delivery tag with respect to the geospatial boundary. This can be performed by the position determination module 306 executing in the delivery tag 110. The position of the delivery tag with respect to the geospatial boundary may be a binary determination (e.g., in the boundary or outside the boundary). In a more sophisticated example, the position of the delivery tag with respect to the geospatial boundary may indicate the position in terms of its real-world distance from the geospatial boundary. This may be desirable to account for inherent inaccuracies in the computation of the position and the location of the geospatial boundary. These inaccuracies may be based on the geographic surroundings (e.g., mountains, hills, buildings, or other obstacles that can obscure location sensors) or manufacturing accuracy of the location sensor.

At 912, the process 900 includes detecting that the delivery tag has moved outside the geospatial boundary. This can be performed by the position determination module 306 executing in the delivery tag 110. Detecting that the delivery tag has moved outside the geospatial boundary can be based on the position determined at 910.

At 914, the process 900 includes generating an alarm. This can be performed by the alarm generation module 308 (FIG. 3) executing in the delivery tag 110. The alarm can be generated in response to the detection at 912. Generation of the alarm at 914, may cause emission of a fluid at 916. This can be performed by the action execution module 310 (FIG.

3) executing in the delivery tag 110. In some examples, the delivery tag 110 can include a fluid circuit that can be triggered by the alarm. For example, the alarm (or a signal based on the alarm) can be provided to the fluid circuit to trigger emission of the fluid. The fluid, as described herein, can be any suitable liquid or dye that can later be detected by a scanner such as the scanner 202. In some examples, generating the alarm may be based at least in part on a delivery event. For example, an example delivery event may be when a delivery agent indicates a package as delivered using a handheld delivery device. If the delivery tag 110 is located outside the geospatial boundary when the delivery agent indicates the package as delivered (which may be indicative of an anomaly event), the alarm may be generated, which may in turn cause the fluid to be emitted. In some examples, causing emission of the fluid may be based at least in part on a distance between a handheld delivery device and the delivery tag 110, e.g., based on relative locations determined using location sensors of the handheld delivery device and the delivery tag 110, or upon scanning of the delivery tag 110 or delivery label on the package 112 using the handheld delivery device. In this manner, it may be more likely that the emitted fluid will at least partially come into contact with the delivery agent who is carrying the handheld delivery device as opposed to the fluid being emitted when the delivery agent is far from the delivery label (e.g., when the delivery label (and package) are located in a compartment of a delivery vehicle). In some examples, the distance may correspond to a spray radius of the fluid circuit.

At 918, the process 900 includes sending information about the alarm. This can be performed by the feedback module 312 (FIG. 3) executing in the delivery tag 110. The information about the alarm can at least indicate that the alarm was triggered. The information about the alarm can also include the condition surrounding triggering of the alarm. Thus, the information can identify the delivery tag 110, the delivery agent associated with the delivery tag 110, a customer order associated with the delivery tag 110, the position determined at 910, and any other suitable information relating to the alarm. In some examples, this information can be considered anomaly information because it can be used to describe the anomaly (e.g., anomalous behavior of the delivery agent or package or tag) that triggered the alarm. The information about the alarm can be provided to any of a set of devices. In this example, the information is provided to the server computers 104 at 920, which is received by the server computers 104 at 922. The information may also be provided to a receiving tag at 924, in which the receiving tag can be a passive RFID tag associated with the identification tag 114. The information may also be provided to a user device at 926 such as the user device 108.

At 922, the process 900 includes receiving the information about the alarm from the delivery tag 110. This can be performed by the feedback module 312 executing in the server computers 104.

At 928, the process 900 includes updating a record based on the information about the alarm. This can be performed by the feedback module 312 executing in the server computers 104. The record can be a record of the delivery agent associated with the delivery tag 110 and the package to which the delivery tag is attached. Thus, the record may be updated to include any incidents and/or anomalies determined between when the agent received the package for delivery and when the agent marked the package as delivered, or if the agent never marked the package as delivered, then when the delivery agent returned to the transportation node.

Figure 10:
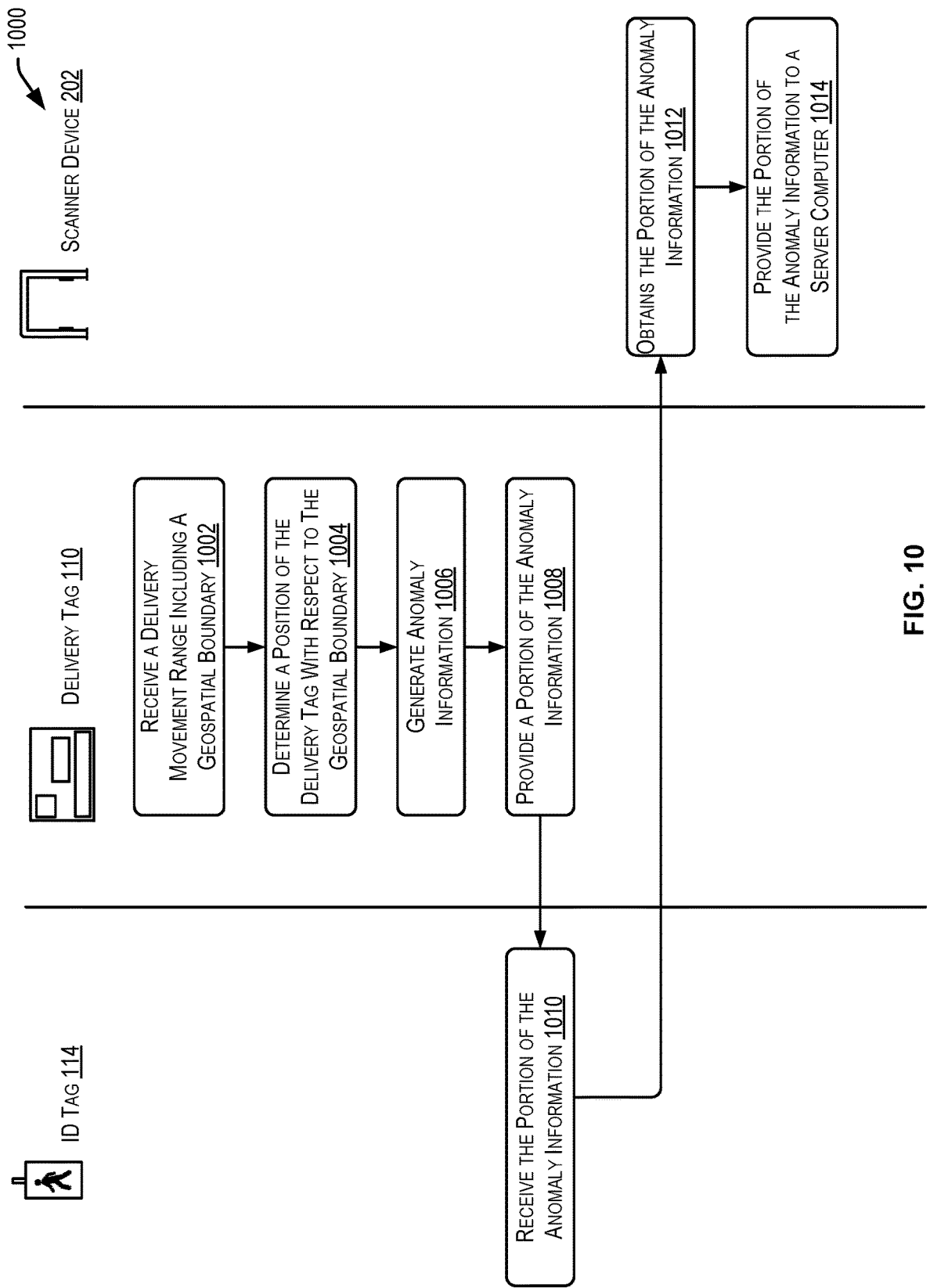
FIG. 10 is a flow diagram depicting example acts for implementing techniques relating to tracking movements of delivery packages with respect to delivery movement ranges as described herein, according to at least one example.

FIG. 10 depicts the process 1000 including example acts or techniques relating to tracking movements of delivery packages with respect to delivery movement ranges, according to at least one example. The delivery management module 220 executing in the delivery tag 110 may perform the process 1000 of FIG. 10.

The process 1000 begins at 1002 by receiving a delivery movement range including a geospatial boundary. This can be performed by the movement range determination module 304 (FIG. 3) executing in the delivery tag 110, which can be an active tag as described in FIG. 7. The delivery movement range may be associated with executing delivery of a package to a customer at a delivery location. In some examples, the process 1000 also stores the delivery movement range and/or the geospatial boundary.

At 1004, the process 1000 includes determining a position of the delivery tag with respect to the geospatial boundary. This can be performed by the position determination module 306 (FIG. 3) executing in the delivery tag 110. In some examples, the position of the delivery tag is determined based on location information received from a location sensor. In some examples, determining the position can also include detecting movement of the delivery tag 110 across the geospatial boundary.

At 1006, the process 1000 includes generating anomaly information. This can be performed by the alarm generation module 308 (FIG. 3) executing in the delivery tag 110. In some examples, the anomaly information may be generated based at least in part on detecting the position being outside the geospatial boundary. The anomaly information may identify the delivery tag 110 and include information about the detected position. The anomaly information may also include a duration of the active tag being outside the geospatial boundary and a distance between the geospatial boundary and the position of the delivery tag 110 outside the geospatial boundary. In some examples, the anomaly information may be generated based on more than one delivery tag being located outside the geospatial boundary.

At 1008, the process 1000 includes providing a portion of the anomaly information. This can be performed by the feedback module 312 (FIG. 3) executing in the delivery tag 110, e.g., via the RF transceiver of 720 of delivery tag 706. The portion of the anomaly information can be provided to the identification tag 114. At 1010, the process 900 includes receiving the portion of the anomaly information. This can be performed by the identification tag 114, which can be a passive tag, e.g., a passive RFID tag. The portion of the anomaly information can be received and stored in memory by the identification tag 114, e.g., written to the passive RFID tag of the identification tag 114 via RF signals received from the RF transceiver 720 of the delivery tag 706. The identification tag 114 can be associated with the delivery agent responsible for delivering the package associated with the delivery tag 110. When the delivery agent next scans the identification tag 114 (e.g., as part of entering a building associated with their employer), the process, at 1012, includes obtaining the portion of the anomaly information. This can be performed by the scanner 202. In some examples, the portion of the anomaly information is obtained from the identification tag 114 as the identification tag is scanned by the scanner 202.

At 1014, the process 1000 includes providing the portion of the anomaly information to a server computer. This can be performed by the scanner 202. The anomaly information can be analyzed and/or recorded by the server computer in accordance with techniques described herein.

Figure 11:
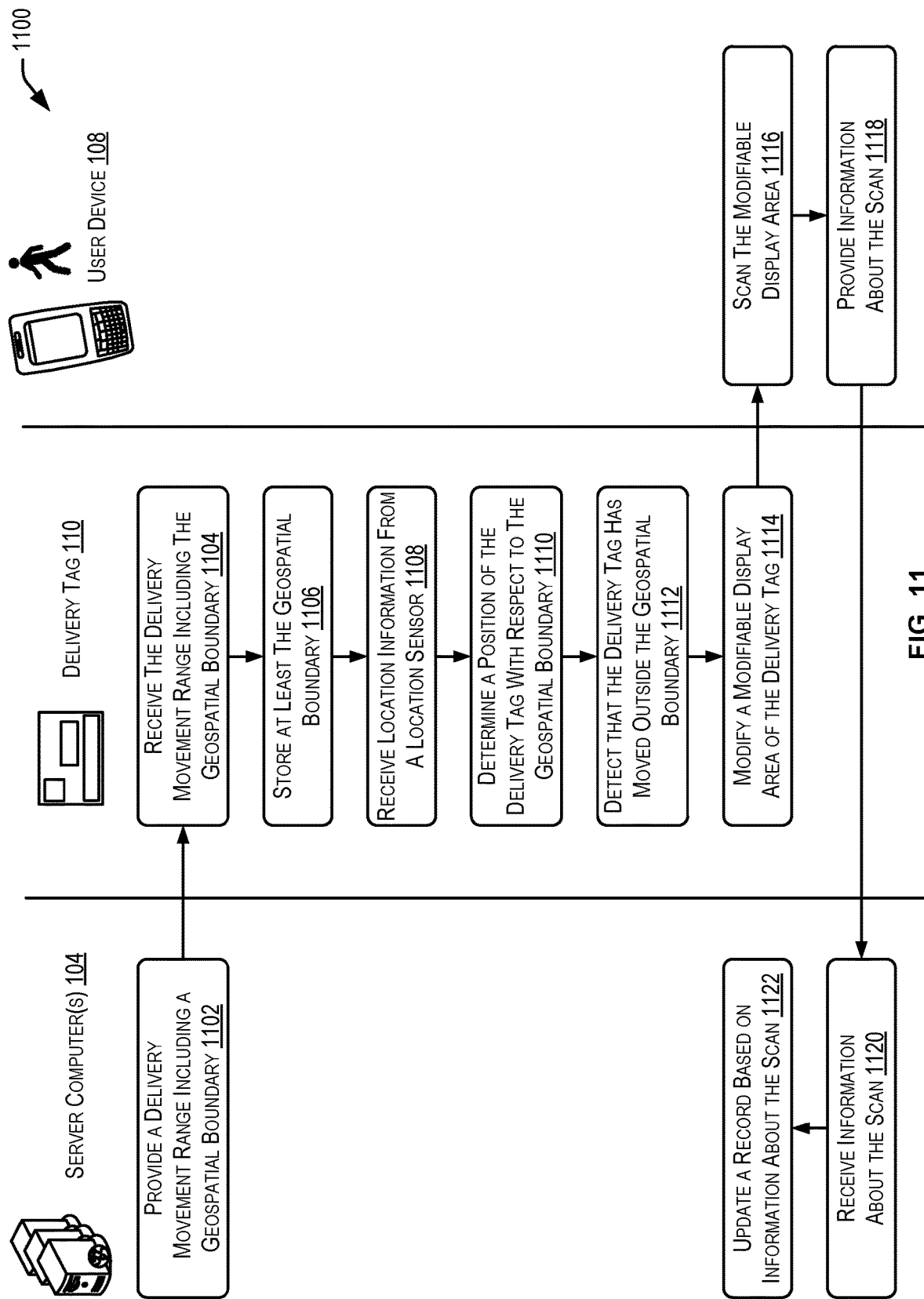
FIG. 11 is a flow diagram depicting example acts for implementing techniques relating to tracking movements of delivery packages with respect to delivery movement ranges as described herein, according to at least one example.

FIG. 11 depicts the process 1100 including example acts or techniques relating to tracking movements of delivery packages with respect to delivery movement ranges, according to at least one example. The delivery management module 220, whether embodied in the server computers 104, the delivery tag 110, the user device 108, or any suitable combination of the foregoing may perform the process 1100 of FIG. 11.

The process 1100 begins at 1102 by providing a delivery movement range including a geospatial boundary. This can be performed by the movement range determination module 304 (FIG. 3) executing in the server computers 104. In some examples, the server computers 104 may have previously computed the delivery movement range and the geospatial boundary based at least in part on delivery route.

At 1104, the process 1100 includes receiving the delivery movement range including the geospatial boundary. This can be performed by the movement range determination module 304 executing in the delivery tag 110, which can be an active tag as described in FIG. 7.

At 1106, the process 1100 includes storing at least the geospatial boundary. This can be performed by the movement range determination module 304 executing in the delivery tag 110. Storing the geospatial boundary can include storing in memory and/or additional storage of the delivery tag 110. Storing the geospatial boundary may enable the delivery tag 110 to have access to the geospatial boundary when, at a later time, the delivery tag 110 determines its location with respect to geospatial boundary.

At 1108, the process 1100 includes receiving location information from a location sensor. This can be performed by the position determination module 306 (FIG. 3) executing in the delivery tag 110. The location sensor may be local to the delivery tag 110 and/or within some other device. For example, the location information may be received from the user device 108. In any event, the location information may identify a geographic location of the delivery tag 110. The geographic location may be represented in any suitable convention such as, for example, coordinates, latitudes and longitudes, street address, etc.

At 1110, the process 1100 includes determining a position of the delivery tag with respect to the geospatial boundary. This can be performed by the position determination module 306 executing in the delivery tag 110. Determining the position may be based on the location information. The position of the delivery tag with respect to the geospatial boundary may be a binary determination (e.g., within the boundary or outside the boundary). In a more sophisticated example, the position of the delivery tag with respect to the geospatial boundary may indicate the position in terms of its real-world distance from the geospatial boundary.

At 1112, the process 1100 includes detecting that the delivery tag has moved outside the geospatial boundary. This can be performed by the position determination module 306 executing in the delivery tag 110. Detecting that the delivery tag has moved outside the geospatial boundary can be based on the position determined at 1110.

At 1114, the process 1100 includes modifying a modifiable display area of the delivery tag 110. This can be performed by the action execution module 310 (FIG. 3) executing in the delivery tag 110. Modifying the modifiable display can include sending a signal to the display to cause a lenticular image to display and/or reveal a second version of a barcode. In some examples, a first version of the barcode is included in the modifiable display area prior to 1114. In some examples, the modifiable display area is further modified to display a third version of the barcode in response to input at the user device 108 that indicates that the package has been "delivered" or input that indicates that the package has been picked up. In this manner, the second version of the barcode can be used for fraud prevention, and the third version of the barcode can be used for package returns. For example, the first version can include encoded delivery information relating to delivery of the package to a customer. The second version can include an identifier or can include encoded anomaly information that indicates that the delivery tag 110 has been located outside the geospatial boundary. The third version can include encoded return information (e.g., a return address, a return order number, etc.) for returning the package to a seller. In some examples, the modifiable display area may be further modified to display the first version of the barcode in response to the delivery tag 110 returning to a position within the geospatial boundary. In this manner, the first version of the barcode can be switched to the second version of the barcode when the delivery tag 110 exits the geospatial boundary. If the delivery tag 110 enters back within the geospatial boundary, the second version of the barcode can be switched back to the first version of the barcode. In some examples, the delivery tag 110 may nevertheless record that the delivery tag 110 was at one time located outside the geospatial boundary, even if the first version of the barcode is displayed when the user device 108 is used to scan the second version of the barcode in connection with a delivery event.

In some examples, modifying the modifiable display area is based at least in part on detecting that a duration of the position of the delivery tag being outside the geospatial boundary has exceeded a duration threshold that indicates a maximum duration for the delivery tag to be outside the geospatial boundary. In some examples, modifying the modifiable display area is based at least in part on detecting that a number of incidents of the position of the delivery tag being outside the geospatial boundary has exceeded an incident threshold that indicates a maximum number of individual incidents for the modifiable delivery tag to be outside the geospatial boundary.

At 1116, the process 1100 includes scanning the modifiable display area. This can be performed by the delivery module 534 (FIG. 5) executing in the user device 108. Scanning the modifiable display area can include scanning the second version of the barcode that identifies the position. In some examples, the scan at 1116 may be associated with the delivery agent indicating the item as delivered. For example, the scan may take place after the delivery tag 110 has been moved outside the geospatial boundary, but before the package has been dropped off with the customer.

At 1118, the process 1100 includes providing information about the scan. This can be performed by the feedback module 312 (FIG. 3) executing in the user device 108. This can be provided via a network and in accordance with a schedule (e.g., at the end of a shift), in response to certain events (e.g., detection of an incident or an anomaly), periodically (e.g., every hour), or in any other manner.

At 1120, the process 1100 includes receiving the information about the scan. This can be performed by the feedback module 312 executing in the server computers 104. The information about the scan can be received from the user device 108.

At 1122, the process 1100 includes updating a record based on the information about the scan. This can be performed by the feedback module 312 executing in the server computers 104. The record can be a record of the delivery agent associated with the delivery tag 110 and the package to which the delivery label is attached. Thus, the record may be updated to include any incidents and/or anomalies determined between when the agent received the package for delivery and when the agent marked the package as delivered, or if the agent never marked the package as delivered, then when the delivery agent returned to the transportation node.

Figure 12:
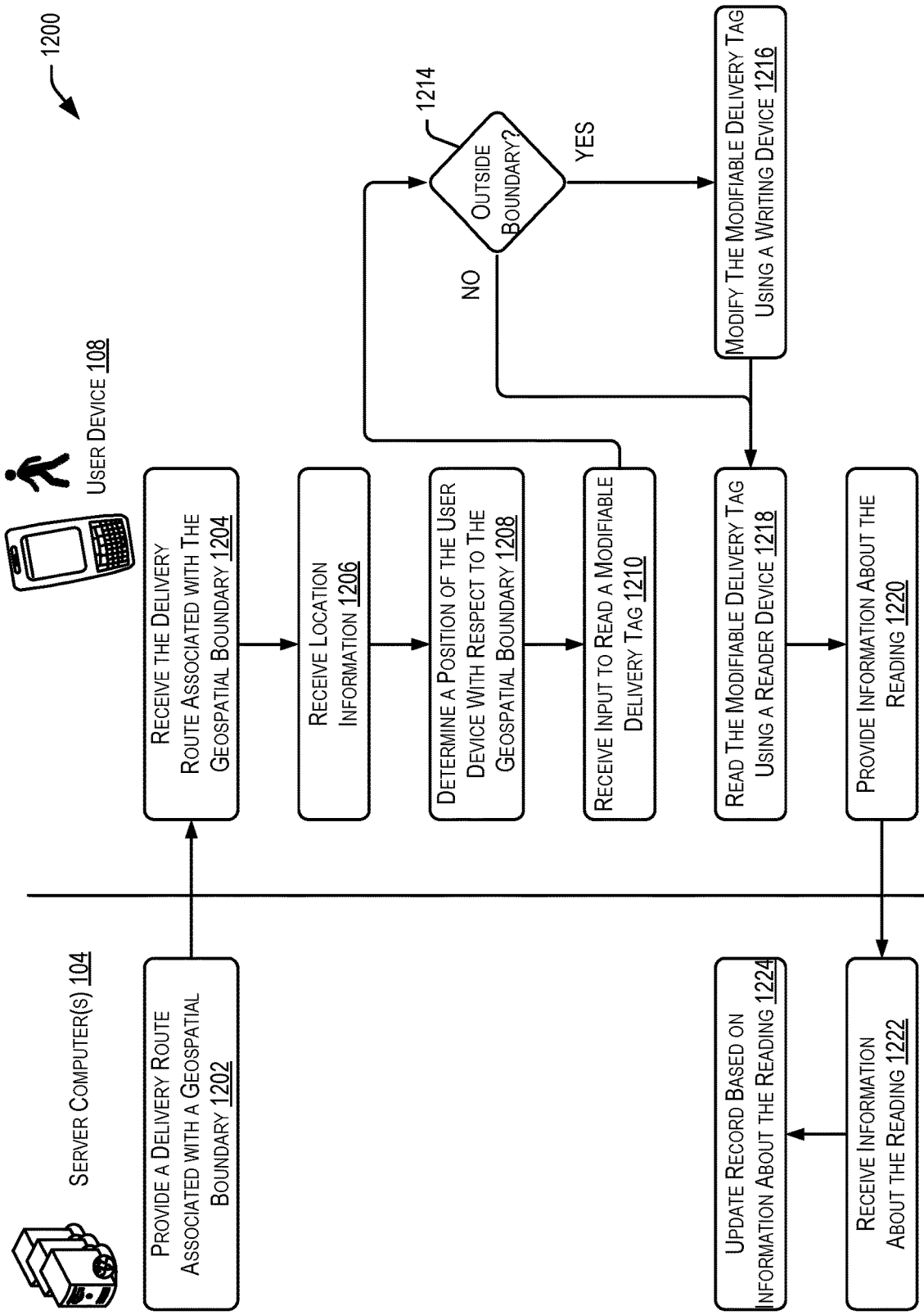
FIG. 12 is a flow diagram depicting example acts for implementing techniques relating to tracking movements of delivery packages with respect to delivery movement ranges as described herein, according to at least one example.

FIG. 12 depicts the process 1200 including example acts or techniques relating to tracking movements of delivery packages with respect to delivery movement ranges, according to at least one example. The delivery management module 220, whether embodied in the server computers 104, the user device 108, or any suitable combination of the foregoing may perform the process 1200 of FIG. 12.

The process 1200 begins at 1202 by providing a delivery movement range associated with a geospatial boundary. This can be performed by the movement range determination module 304 (FIG. 3) executing in the server computers 104. In some examples, the server computers 104 may have previously computed the delivery movement range and the geospatial boundary based at least in part on a delivery route.

At 1204, the process 1200 includes receiving the delivery movement range associated with the geospatial boundary. This can be performed by the movement range determination module 304 executing in the user device 108.

At 1206, the process 1200 includes receiving location information. This can be performed by the position determination module 306 (FIG. 3) executing in the user device 108. The information location can be received from a location sensor. The location sensor may be local to the user device 108 and/or within some other device. In any event, the location information may be used to identify a geographic location of the user device 108. The geographic location may be represented in any suitable convention such as, for example, coordinates, latitudes and longitudes, street address, etc.

At 1208, the process 1100 includes determining a position of the user device with respect to the geospatial boundary. This can be performed by the position determination module 306 executing in the user device 108. Determining the position may be based on the location information. The position of the user device 108 with respect to the geospatial boundary may be a binary determination (e.g., within the boundary or outside the boundary). In a more sophisticated example, the position of the user device 108 with respect to the geospatial boundary may indicate the position in terms of its real-world distance from the geospatial boundary. This may be desirable to account for inherent inaccuracies in the position and the location of the geospatial boundary.

At 1210, the process 1200 includes receiving input to read a modifiable delivery tag. This can be performed by the delivery module 534 (FIG. 5) executing in the user device 108. The input can be received via an input device (e.g., a keyboard, touch screen, etc.) on the user device 108. For example, the input can be a user input to mark a package as "delivered." The modifiable delivery tag, which can be an active tag as described in FIG. 7, can include first identification information, a first version of a barcode, a first barcode, or any other suitable machine- and/or human-readable information. In some examples, at least a portion of the first identification information, etc. can be printed on a photo-sensitive substrate. The substrate may be coated with a photo-sensitive material in order to become sensitive.

At 1212, the process 1200 includes determining whether the user device 108 is located outside the geospatial boundary at the time when the input is received at 1210. This can be performed by the position determination module 306 (FIG. 3) executing in the user device 108. In practice, this can include comparing the coordinates associated with the geospatial boundary with coordinates of the user device 108. If the user device 108 is located outside the geospatial boundary at 1214, the process continues to 1216. At 1216, the process 1200 includes modifying the modifiable delivery tag using a writing device. This can be performed by the action execution module 310 (FIG. 3) executing in the user device 108. The modification can take place as the writing device, which is an example of the writing device 530, modifies the first identification information, etc., to create second identification information, a second version of the barcode, a second barcode, or any other suitable machine- and/or human-readable information. The writing device can write by using a photolithography process on the photo-sensitive substrate.

In some examples, modifying the modifiable delivery tag is based at least in part on detecting that a duration of the position of the delivery tag being outside the geospatial boundary has exceeded a duration threshold that indicates a maximum duration for the delivery tag to be outside the geospatial boundary. In some examples, modifying the modifiable delivery tag is based at least in part on detecting that a number of incidents of the position of the delivery tag being outside the geospatial boundary has exceeded an incident threshold that indicates a maximum number of individual incidents for the modifiable delivery tag to be outside the geospatial boundary.

If the user device 108 is not located outside the geospatial boundary at 1214, the process continues to 1218. At 1218, the process 1200 includes reading the modifiable delivery tag using a reading device. This can be performed by the delivery module 534 executing in the user device 108. The version of information read at 1218 depends in part on the determination made at 1214. For example, if the determination at 1214 was NO, the version of the information read at 1218 is the same as was attempted to be read at 1210, and which was originally included on the modifiable delivery label. However, if the determination at 1214 was YES, the version of the information read at 1218 is a different version than was attempted to be read at 1210, and which was originally included in the modifiable delivery label. Reading this second version may accomplish the purpose for which the scan was initiated at 1210, but may also identify that the user device 108, when first attempted to scan the modifiable delivery label, was located outside the geospatial boundary.

At 1220, the process 1200 includes providing information about the reading. This can be performed by the feedback module 312 (FIG. 3) executing in the user device 108. This can be provided via a network and in accordance with a schedule (e.g., at the end of a shift), in response to certain events (e.g., detection of an incident or an anomaly), periodically (e.g., every hour), or in any other manner.

At 1222, the process 1200 includes receiving the information about the reading. This can be performed by the feedback module 312 executing in the server computers 104. The information about the reading can be received from the user device 108.

At 1224, the process 1200 includes updating a record based on the information about the reading. This can be performed by the feedback module 312 executing in the server computers 104. The record can be a record of the delivery agent associated with the delivery tag 110 and the package to which the delivery label is attached. Thus, the record may be updated to include any incidents and/or anomalies determined between when the agent received the package for delivery and when the agent marked the package as delivered, or if the agent never marked the package as delivered, then when the delivery agent returned to the transportation node.

Example device combinations of the server computer 104, the user device 108, the delivery tag 110, the identification tag 114, the label 600, the delivery tag 606, the label 700, and the delivery tag 706 have been described as performing example acts of the processes 800-1200 illustrated in FIGS. 8-12. While the example device combinations are described as performing these example acts, it should be understood that the techniques relating to tracking movements of delivery packages with respect to delivery movement ranges can include any suitable device combination performing the acts of the processes 800-1200 or performing other acts of other processes, without limitation.

Figure 13:
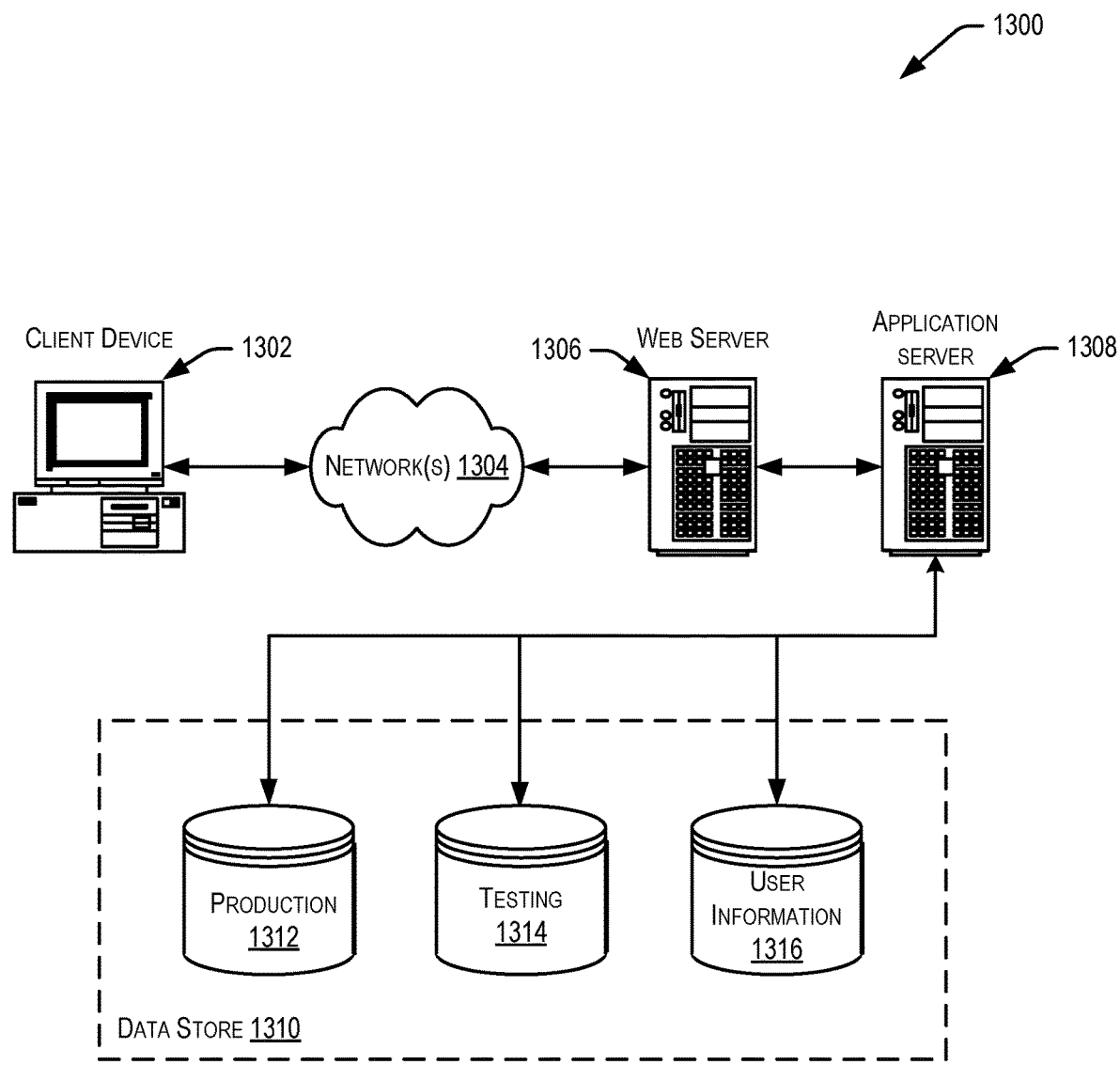
FIG. 13 is an example schematic environment for implementing techniques relating to tracking movements of delivery packages with respect to delivery movement ranges as described herein, according to at least one example.

FIG. 13 illustrates aspects of an example schematic environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any suitable device operable to send and receive requests, messages, or information over a suitable network 1304 and convey information back to a user of the device. Examples of such client devices include personal computers, cell phones, handheld messaging devices, laptop computers, set-top containers, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for accessing requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infra-red network, a wireless network, and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any suitable medium which can be used to store the desired information and which can be accessed by a system device. Based on the disclosure and teachings provided herein, a person of ordinary skill in the art will appreciate other ways and/or methods to implement the various embodiments.

As applicable to embodiments that include RFID tags and systems, generally, RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader is received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present description.

In addition to RFID tags which are automatically coupled with an RFID reader, the systems and methods of the present description may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer, is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a delivery device, comprising:
        a structure configured to attach to a package that is to be delivered to a user location;
        a modifiable display area attached to the structure and configured to display a first version of a barcode, the modifiable display area configured to display any one version of a plurality of versions of the barcode at any one time;
        a fluid emitting device attached to the structure and in communication with a delivery management module; and
        a location sensor attached to the structure and in communication with the delivery management module, the delivery management module configured to:
            receive a delivery movement range that indicates a geospatial boundary associated with delivering the package to the user location;
            receive location information from the location sensor; [[and]]
            modify the modifiable display area to display a second version of the barcode in response to detecting the delivery device has moved outside the geospatial boundary based at least in part on the location information; and
            send a signal to the fluid emitting device based at least in part on the geospatial boundary and the location information, the fluid emitting device being configured to emit a fluid outside of the delivery device responsive to receiving the signal; and
    a scanner configured to detect the fluid as indicating that the package was outside the geospatial boundary when delivered.

2. The system of claim 1, wherein the barcode comprises an indicator region and a barcode region, the first version of the barcode comprising a first indicator in the indicator region and the barcode in the barcode region, the second version of the barcode comprising a second indicator in the indicator region and the barcode in the barcode region.

3. The system of claim 1, wherein the modifiable display area comprises a lenticular image comprising the first version of the barcode and the second version of the barcode, wherein irrespective of a viewing angle at which the modifiable display area is viewed, only one of the first version of the barcode or the second version of the barcode is visible at any one time.

4. The system of claim 3, wherein modifying the modifiable display area to display the second version of the barcode comprises the delivery management module sending a second signal to the modifiable display area that causes the lenticular image to reveal the second version of the barcode.

5. The system of claim 4, wherein the modifiable display area comprises a plurality of images printed using lenticular printing, each image of the plurality of images being associated with a corresponding version of the plurality of versions of the barcode and being selectable based at least in part on the second signal from the delivery management module.

6. The system of claim 1, wherein the first version of the barcode includes encoded delivery information for delivering the package to the user location, the second version of the barcode includes encoded anomaly information identifying that the delivery device was located outside the geospatial boundary, and a third version of the barcode includes encoded return information for returning the package to a sender.

7. The system of claim 6, wherein the delivery management module is further configured to:
  receive a third signal from a user device, the third signal generated by the user device responsive to receiving input indicating that the package has been delivered to the user location or that the package has been picked up from the user location; and
  modifying, based at least in part on the third signal, the modifiable display area to display the third version of the barcode.

8. A computer-implemented method, comprising:
  receiving a delivery movement range indicating a geospatial boundary associated with delivering a package to a user at a delivery location, the package having a modifiable delivery tag attached thereto, the modifiable delivery tag comprising a modifiable display area and a fluid emitting device, the modifiable display area including first identification information relating to the package;
  prior to delivering the package to the user at the delivery location, receiving location information;
  causing modification of the modifiable display area to include second identification information relating to the package based at least in part on the geospatial boundary and the location information;
  causing sending of a signal to the fluid emitting device based at least in part on the geospatial boundary and the location information, the fluid emitting device being configured to emit the fluid outside the modifiable delivery tag in response to receiving the signal; and
  detecting, by a scanner, the fluid as indicated that the package was outside the geospatial boundary when delivered.

9. The computer-implemented method of claim 8, wherein the first identification information relating to the package comprises a first version of a barcode including encoded delivery information relating to delivering the package to the user at the delivery location, and the second identification information relating to the package comprises a second version of the barcode including encoded anomaly information identifying that the modifiable delivery tag was located outside the geospatial boundary at least once.

10. The computer-implemented method of claim 8, further comprising:
  scanning the second identification information relating to the package;
  generating, based at least in part on information associated with the second identification information, anomaly information that at least indicates that the modifiable delivery tag was located outside the geospatial boundary at least once; and
  transmitting at least a portion of the anomaly information to a server.

11. The computer-implemented method of claim 8, wherein the modifiable display area comprises a lenticular image, wherein causing the modification of the modifiable display area to include the second identification information relating to the package comprises causing sending of a second signal to the modifiable display area that causes the lenticular image to reveal the second identification information relating to the package.

12. The computer-implemented method of claim 8, wherein causing the modification of the modifiable display area to include the second identification information relating to the package comprises:
  causing a writing device of a user device to modify one or more physical characteristics of the modifiable display area to create the second identification information relating to the package; or
  causing a mechanism of the modifiable display area to rotate such that the first identification information is hidden and the second identification information is visible.

13. The computer-implemented method of claim 8, wherein causing the modification of the modifiable display area to display the second identification information is based at least in part on detecting that a duration of a position of the modifiable delivery tag being outside the geospatial boundary has exceeded a duration threshold that indicates a maximum duration for the modifiable delivery tag to be outside the geospatial boundary.

14. The computer-implemented method of claim 8, further comprising determining a plurality of distance measurements representing distances between the geospatial boundary and a plurality of positions outside the geospatial boundary at which the modifiable delivery tag was located.

15. The computer-implemented method of claim 14, wherein causing the modification of the modifiable display area to include the second identification information relating to the package is further based at least in part on detecting that at least one distance measurement of the plurality of distance measurements exceeds a distance threshold that indicates a maximum distance for the modifiable delivery tag to be located with respect to the geospatial boundary while transporting the package for delivery to the user at the delivery location.

16. The computer-implemented method of claim 8, wherein the signal is sent responsive to at least one of: i) determining, from the geospatial boundary and the location information, that the modifiable delivery tag is outside the geospatial boundary, or ii) determining, from the geospatial boundary and the location information, that a quantity of a plurality of incidents of a position of the modifiable delivery tag being outside the geospatial boundary has exceeded an incident threshold that indicates a maximum number of individual incidents for the modifiable delivery tag to be outside the geospatial boundary while transporting the package for delivery to the delivery location.

17. The computer-implemented method of claim 8, wherein the fluid is unique to at least one of: i) a batch of modifiable delivery tags comprising the modifiable delivery tag, ii) the modifiable delivery tag, iii) an agent tasked with delivering the package, iv) the package, or v) a route utilized to deliver the package to the user at the delivery location.

18. One or more non-transitory computer-readable media comprising computer-executable instructions that, when executed by one or more computer systems, cause the one or more computer systems to perform operations comprising:
  receiving a delivery movement range indicating a geospatial boundary for executing delivery of a package to a user at a delivery location, the package having a modifiable delivery tag attached thereto, the modifiable delivery tag and a fluid emitting device, the modifiable delivery tag comprising a modifiable display area that includes first identification information relating to the package;

prior to the delivery of the package to the user at the delivery location, receiving location information;

causing modification of the modifiable display area to include second identification information relating to the package based at least in part on the geospatial boundary and the location information;

causing sending of a signal to the fluid emitting device based at least in part on the geospatial boundary and the location information, the fluid emitting device being configured to emit a fluid outside the modifiable delivery tag in response to receiving the signal; and detecting, by a scanner, the fluid as indicating that the package was outside the geospatial boundary when delivered.

19. The one or more non-transitory computer-readable media of claim 18, wherein the first identification information relating to the package comprises a first version of a barcode including encoded delivery information relating to delivering the package to the user at the delivery location, and the second identification information relating to the package comprises a second version of the barcode including encoded anomaly information identifying that the modifiable delivery tag was located outside the geospatial boundary at least once.

20. The one or more non-transitory computer-readable media of claim 18, wherein at least one of the modifiable delivery tag or the package is identifiable from the fluid.

* * * * *